United States Patent
Gathala et al.

(10) Patent No.: US 9,448,859 B2
(45) Date of Patent: Sep. 20, 2016

(54) EXPLOITING HOT APPLICATION PROGRAMMING INTERFACES (APIS) AND ACTION PATTERNS FOR EFFICIENT STORAGE OF API LOGS ON MOBILE DEVICES FOR BEHAVIORAL ANALYSIS

(71) Applicant: QUALCOMM Incorporated, San Diego, CA (US)

(72) Inventors: Sudha Anil Kumar Gathala, Santa Clara, CA (US); Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/028,914

(22) Filed: Sep. 17, 2013

(65) Prior Publication Data
US 2015/0082441 A1    Mar. 19, 2015

(51) Int. Cl.
*G06F 9/54* (2006.01)

(52) U.S. Cl.
CPC ................................. *G06F 9/541* (2013.01)

(58) Field of Classification Search
None
See application file for complete search history.

(56) References Cited

U.S. PATENT DOCUMENTS

| | | | |
|---|---|---|---|
| 8,166,543 B2 | 4/2012 | Park et al. | |
| 2003/0158911 A1* | 8/2003 | Lou et al. | 709/218 |
| 2008/0201308 A1* | 8/2008 | Sayfan | 707/4 |
| 2008/0243632 A1* | 10/2008 | Kane et al. | 705/26 |
| 2009/0199133 A1* | 8/2009 | Deutsch et al. | 715/811 |
| 2012/0166869 A1* | 6/2012 | Young et al. | 714/15 |
| 2012/0210423 A1 | 8/2012 | Friedrichs et al. | |
| 2012/0222120 A1 | 8/2012 | Rim et al. | |
| 2013/0097706 A1 | 4/2013 | Titonis et al. | |
| 2013/0122861 A1* | 5/2013 | Kim et al. | 455/410 |
| 2013/0167231 A1* | 6/2013 | Raman et al. | 726/23 |

FOREIGN PATENT DOCUMENTS

KR    20110128632 A    11/2011

OTHER PUBLICATIONS

Bose A., et al., "Behavioral Detection of Malware on Mobile Handsets," MobiSys '08, Jun. 17-20, 2008, pp. 225-238.
Xie L., et al., "pBMDS: A Behaviour-based Malware Detection System for Cellphone Devices," Wisec '10, Mar. 22-24, 2010, pp. 37-48.

* cited by examiner

*Primary Examiner* — David Le
(74) *Attorney, Agent, or Firm* — The Marbury Law Group, PLLC

(57) ABSTRACT

Methods and devices for detecting suspicious or performance-degrading mobile device behaviors may include performing behavior monitoring and analysis operations to intelligently, dynamically, and/or adaptively determine the mobile device behaviors that are to be observed, the number of behaviors that are to be observed, and the level of detail or granularity at which the behaviors are to be observed. Such behavior monitoring and analysis operations may be performed continuously (or near continuously) in a mobile device without consuming an excessive amount of processing, memory, or energy resources of the mobile device by identifying hot application programming interfaces (APIs) and hot action patterns that are invoked or used most frequently by software applications of the mobile device and storing information regarding these hot APIs and hot action patterns separately and more efficiently.

28 Claims, 15 Drawing Sheets

EXPLOITING HOT APPLICATION PROGRAMMING INTERFACES (APIS) AND ACTION PATTERNS FOR EFFICIENT STORAGE OF API LOGS ON MOBILE DEVICES FOR BEHAVIORAL ANALYSIS

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of analyzing behaviors within a mobile device, which may include identifying hot application programming interfaces (APIs) by identifying APIs that are used most frequently by software applications executing on the mobile device, storing information regarding usage of identified hot APIs in a hot API log in a memory of the mobile device, and performing behavior analysis operations based on the information stored in the hot API log to identify mobile device behaviors that are inconsistent with normal operation patterns. The hot API log may be generated so that it is organized such that that the values of generic fields that remain the same across invocations of an API are stored in a separate table as the values of specific fields that are specific to each invocation of the API. The hot API log may also be generated so that the values of the specific fields are stored in a table along with hash keys to the separate table that stores the values of the generic fields.

In an aspect, storing information regarding usage of identified hot APIs in the hot API log may include identifying sequences of hot API invocations that are repeated frequently, and storing the identified sequences of hot API invocations as hot action patterns in a hot action pattern log. In a further aspect, performing the behavior analysis operations based on the information stored in the hot API log may include comparing hot action patterns stored in the hot action pattern log to known statistics of API usage and classifying a mobile device behavior as malicious or benign based on a result of comparing hot action patterns to known statistics of API usage. In a further aspect, identifying APIs that are used most frequently by software applications executing on the mobile device may include monitoring one or more of library API calls, system API calls, and driver API calls by reading information from an API log file.

In a further aspect, storing information regarding usage of identified hot APIs in the hot API log may include classifying an API information field as a generic field in response to determining that there is a low probability that a value of the API information field will change across different invocations of that API. In a further aspect, storing information regarding usage of identified hot APIs in the hot API log may include classifying an API information field as a generic field in response to determining that there is a low probability that a value of the API information field will be used when performing the behavior analysis operations.

In a further aspect, storing information regarding usage of identified hot APIs in the hot API log may include classifying an API information field as a specific field in response to determining that there is a high probability that a value of the API information field will change across different invocations of that API. In a further aspect, storing information regarding usage of identified hot APIs in the hot API log may include classifying an API information field as a specific field in response to determining that there is a high probability that a value of the API information field will be used when performing the behavior analysis operations.

Further aspects include a computing device that includes means for identifying hot application programming interfaces (APIs) by identifying APIs that are used most frequently by software applications executing on the mobile device, means for storing information regarding usage of identified hot APIs in a hot API log in a memory of the mobile device, and means for performing behavior analysis operations based on the information stored in the hot API log to identify mobile device behaviors that are inconsistent with normal operation patterns. The computing device may include means for generating the hot API log so that it is organized such that values of generic fields that remain the same across invocations of an API are stored in a separate table as values of specific fields that are specific to each invocation of the API, and so that the values of the specific fields are stored in a table along with hash keys to the separate table that stores the values of the generic fields.

In an aspect, means for storing information regarding usage of identified hot APIs in the hot API log may include means for identifying sequences of hot API invocations that are repeated frequently, and means for storing the identified sequences of hot API invocations as hot action patterns in a hot action pattern log. In a further aspect, means for performing behavior analysis operations based on the information stored in the hot API log may include means for comparing hot action patterns stored in the hot action pattern log to known statistics of API usage, and means for classifying a mobile device behavior as malicious or benign based on a result of comparing hot action patterns to known statistics of API usage. In a further aspect, means for identifying APIs that are used most frequently by software applications executing on the mobile device may include means for monitoring one or more of library API calls, system API calls, and driver API calls by reading information from an API log file.

In a further aspect, means for storing information regarding usage of identified hot APIs in the hot API log may include means for classifying an API information field as a generic field in response to determining that there is a low probability that a value of the API information field will change across different invocations of that API. In a further aspect, for storing information regarding usage of identified hot APIs in the hot API log may include means for classifying an API information field as a generic field in response to determining that there is a low probability that a value of the API information field will be used by the means for performing behavior analysis operations.

In a further aspect, means for storing information regarding usage of identified hot APIs in the hot API log may include means for classifying an API information field as a specific field in response to determining that there is a high probability that a value of the API information field will change across different invocations of that API. In a further aspect, means for storing information regarding usage of identified hot APIs in the hot API log may include means for classifying an API information field as a specific field in response to determining that there is a high probability that a value of the API information field will be used by the means for performing behavior analysis operations.

Further aspects include a mobile computing device that includes a processor configured with processor-executable instructions to perform operations that include identifying hot APIs by identifying APIs that are used most frequently by software applications executing on the mobile device, storing information regarding usage of identified hot APIs in a hot API log in the memory, and performing behavior analysis operations based on the information stored in the hot API log to identify mobile device behaviors that are inconsistent with normal operation patterns. The processor may be configured to generate the hot API log so that it is organized so that values of generic fields that remain the same across invocations of an API are stored in a separate table as values of specific fields that are specific to each invocation of the API, and so that the values of the specific fields are stored in a table along with hash keys to the separate table that stores the values of the generic fields.

In an aspect, the processor may be configured with processor-executable instructions to perform operations such that storing information regarding usage of identified hot APIs in the hot API log may include identifying sequences of hot API invocations that are repeated frequently, and storing the identified sequences of hot API invocations as hot action patterns in a hot action pattern log, and the processor is further configured with processor-executable instructions to perform operations such that performing the behavior analysis operations based on the information stored in the hot API log may include comparing hot action patterns stored in the hot action pattern log to known statistics of API usage, and classifying a mobile device behavior as malicious or benign based on a result of comparing hot action patterns to known statistics of API usage. In a further aspect, the processor may be configured with processor-executable instructions to perform operations such that identifying APIs that are used most frequently by software applications executing on the mobile device may include monitoring one or more of library API calls, system API calls, and driver API calls by reading information from an API log file.

In a further aspect, the processor may be configured with processor-executable instructions to perform operations such that storing information regarding usage of identified hot APIs in the hot API log may include classifying an API information field as a generic field in response to determining that there is a low probability that a value of the API information field will change across different invocations of that API. In a further aspect, the processor may be configured with processor-executable instructions to perform operations such that storing information regarding usage of identified hot APIs in the hot API log may include classifying an API information field as a generic field in response to determining that there is a low probability that a value of the API information field will be used when performing the behavior analysis operations.

In a further aspect, the processor may be configured with processor-executable instructions to perform operations such that storing information regarding usage of identified hot APIs in the hot API log may include classifying an API information field as a specific field in response to determining that there is a high probability that a value of the API information field will change across different invocations of that API. In a further aspect, the processor may be configured with processor-executable instructions to perform operations such that storing information regarding usage of identified hot APIs in the hot API log may include classifying an API information field as a specific field in response to determining that there is a high probability that a value of the API information field will be used when performing the behavior analysis operations.

Further aspects include a non-transitory computer readable storage medium having stored thereon processor-executable software instructions configured to cause a mobile device processor of a mobile device to perform operations that include identifying hot application programming interfaces (APIs) by identifying APIs that are used most frequently by software applications executing on the mobile device, storing information regarding usage of identified hot APIs in a hot API log in a memory of the mobile device, and performing behavior analysis operations based on the information stored in the hot API log to identify mobile device behaviors that are inconsistent with normal operation patterns. The stored thereon processor-executable software instructions may also be configured to cause the processor to generate the hot API log so that it is organized so that values of generic fields that remain the same across invocations of an API are stored in a separate table as values of specific fields that are specific to each invocation of the API, and so that the values of the specific fields are stored in a table along with hash keys to the separate table that stores the values of the generic fields.

In an aspect, the stored processor-executable software instructions may be configured to cause a processor to perform operations such that storing information regarding usage of identified hot APIs in the hot API log may include identifying sequences of hot API invocations that are repeated frequently, and storing the identified sequences of hot API invocations as hot action patterns in a hot action pattern log, and performing the behavior analysis operations based on the information stored in the hot API log may include comparing hot action patterns stored in the hot action pattern log to known statistics of API usage, and classifying a mobile device behavior as malicious or benign based on a result of comparing hot action patterns to known statistics of API usage. In a further aspect, the stored processor-executable software instructions may be configured to cause a processor to perform operations such that identifying APIs that are used most frequently by software applications executing on the mobile device may include monitoring one or more of library API calls, system API calls, and driver API calls by reading information from an API log file.

In a further aspect, the stored processor-executable software instructions may be configured to cause a processor to perform operations such that storing information regarding usage of identified hot APIs in the hot API log may include classifying an API information field as a generic field in response to determining that there is a low probability that a value of the API information field will change across different invocations of that API. In a further aspect, the stored processor-executable software instructions may be configured to cause a processor to perform operations such that storing information regarding usage of identified hot APIs in the hot API log may include classifying an API information field as a generic field in response to determining that there is a low probability that a value of the API information field will be used when performing the behavior analysis operations.

In a further aspect, the stored processor-executable software instructions may be configured to cause a processor to perform operations such that storing information regarding usage of identified hot APIs in the hot API log may include classifying an API information field as a specific field in response to determining that there is a high probability that a value of the API information field will change across different invocations of that API. In a further aspect, the stored processor-executable software instructions may be configured to cause a processor to perform operations such that storing information regarding usage of identified hot APIs in the hot API log may include classifying an API information field as a specific field in response to determining that there is a high probability that a value of the API information field will be used when performing the behavior analysis operations.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
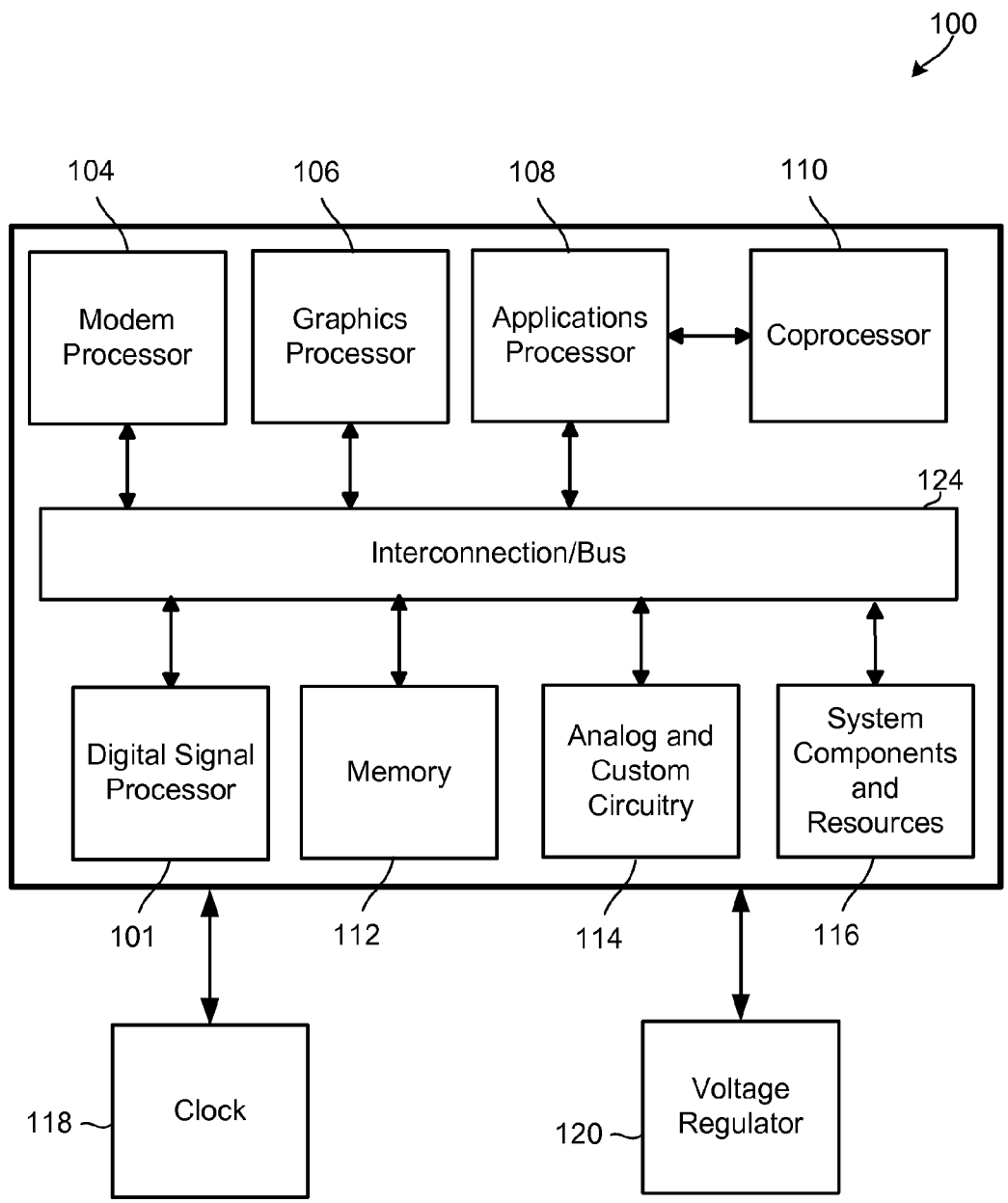
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery power, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of the mobile device over time, including poorly designed software applications, malware, viruses, fragmented memory, background processes, etc. Due to the number, variety, and complexity of these factors, it is often not feasible to evaluate all the various processes, components, behaviors, or factors (or combinations thereof) that may degrade performance and/or power utilization levels of the complex yet resource-constrained systems of modern mobile devices. As such, it is difficult for users, operating systems, and/or application programs (e.g., anti-virus software, etc.) to accurately and efficiently identify the sources of such problems. Therefore, mobile device users currently have few remedies for preventing the degradation in performance and power utilization levels of a mobile device over time, or for restoring an aging mobile device to its original performance and power utilization levels.

The various aspects include mobile devices, systems, and methods for efficiently identifying, preventing, and/or correcting the conditions and/or mobile device behaviors that often degrade a mobile device's performance and/or power utilization levels over time. By identifying hot application programming interfaces (APIs) and hot action patterns that are invoked or used most frequently by software applications of the mobile device, and by storing information regarding the hot APIs and hot action patterns separately and/or more efficiently, the various aspects enable a mobile device to perform behavior monitoring and analysis operations continuously (or near continuously) without consuming an excessive amount of processing, memory, or energy resources of the mobile device.

In an aspect, an observer process, daemon, module, or sub-system (herein collectively referred to as a "module") of the mobile device may instrument or coordinate various APIs, registers, counters or other components (herein collectively "instrumented components") at various levels of the mobile device system. The observer module may monitor mobile device behaviors over a period of time by collecting behavior information from the instrumented components to recognize mobile device behaviors that are inconsistent with normal operation patterns. For example, the observer module may monitor library API calls, system call APIs, driver API calls, and other instrumented components by reading information from log files (e.g., API logs) stored in a memory of the mobile device.

The mobile device may also include an analyzer module, and the observer module may communicate (e.g., via a memory write operation, function call, etc.) the collected behavior information to the analyzer module. The analyzer module may receive and use the behavior information to perform analysis operations, which may include performing, executing, and/or applying data, algorithms, and/or models to determine whether a mobile device behavior is benign or malicious/performance-degrading.

Generally, each software application writes information to an API log during its execution in the mobile device. Since mobile devices are resource-constrained systems, one of the major challenges in performing behavioral monitoring and analysis in a mobile device is managing the log sizes within the limited memory resources (e.g., RAM size) that are available in the mobile device. For example, in the Android and Linux kernels there are over 30,000 APIs. Many of these API's are called/executed repeatedly during the execution of an application, so the total number of API calls/executions is typically very large. As such, the observer module may be required to monitor a large number of APIs or API logs to collect enough behavior information to accurately identify or classify a mobile device behavior. Further, due to the number and complexity of the API calls, each API log may store large amounts of information, including an identifier for each API that is invoked by a software application, as well as time stamps, function arguments, function argument values, caller names, etc. for each time that API is called. Parsing through such large volumes of information to collect or retrieve behavior information may have a significant impact on the performance and power consumption characteristics of the mobile device. For all these reasons, the size and efficiency of these logs may have a large impact on the performance of the observer module, and on the performance and power consumption characteristics of the mobile device.

The various aspects include methods, and mobile computing devices configured to perform the methods, of reducing the size of the log files (e.g., API logs) that are generated and stored in a memory by software applications, and using these reduced size log files to improve the performance of the mobile device when monitoring and classifying device behaviors of the mobile device.

In an aspect, the mobile device may be configured to generate the API logs in a format/structure that reduces the amount of memory resources consumed by the logs and/or that allows the observer module to access and use the behavior information stored in these logs more efficiently.

As discussed above, the observer module may be required to monitor a large number of API calls to collect all the information that is required by the analyzer module when classifying a mobile device behavior. Yet, not all of the monitored APIs will be used evenly or with the same frequency by the software applications of the mobile device. Further, there is often a large discrepancy in the usage of APIs by software applications of the mobile device. Some APIs are used/called rarely, while other APIs (e.g., open, close, send, etc.) are used/called often and repeatedly. As such, storing and processing information for all the APIs in the same or similar manner may be an inefficient use of mobile device resources.

Aspect methods and mobile devices may be configured to identify those APIs that are used/called, and log the usage of those frequently used APIs (rather than entries for each execution of such APIs) in an efficient manner in API logs. APIs that are used most often/frequently are referred to herein as "hot APIs."

In an aspect, the mobile device may be configured to identify hot APIs (i.e., the APIs that are used most frequently), and store information regarding the usage of hot APIs in a hot API log. The observer module may read the API data from the hot API log to quickly and efficiently generate a behavior vector that includes enough information to allow the analyzer module to accurately classify a mobile device behavior as being malicious/performance-degrading or benign.

In an aspect, the mobile device may be configured to generate the hot API logs so that values for "generic fields" that remain the same across invocations of the API are stored in one table while the values for "specific fields" that change with each/most API invocations (and thus are specific to each invocation) are stored in a second, separate table. For example, the mobile device may generate a hot API log made up of a first table that stores values for the generic fields and a second table that stores values for the specific fields related to each API use/call. In an aspect, the specific fields may be stored in the second table along with hash keys linked to the first table (i.e., the table that stores values for the generic fields). By organizing the API log in this manner, the various aspects allow the observer module to generate behavior vectors more efficiently and to include the most relevant information so that the analyzer module may classify mobile device behaviors quicker, while reducing the memory dedicated to API logs and reducing the amount of processing or power resources consumed by the mobile device executing the behavior analysis processes.

In addition to using certain APIs more frequently than others, software applications often repeat certain sequences or patterns of API invocations. In an aspect, the mobile device may be configured to identify frequently used sequences or patterns of API invocations and store the identified sequences/patterns as a "hot action pattern" in an API log file. In various aspects, the mobile device may be configured to store the hot action patterns as a vector, a sequence (<api1, api2, . . . apin>), a regular expression of APIs, a state diagram, or in any other concise structure or format that reduces the amount of memory consumed by the API logs. The hot action patterns may also be generated so that they parameterize a pattern definition, store generic parameters that are the same across invocations of an API only once, etc.

In an aspect, the analyzer module may be configured to compare the hot action patterns to known statistics of API usage to quickly and efficiently classify a mobile device behavior as benign or malicious/performance-degrading.

In various aspects, hot action patterns may be recognized and generated on the mobile device, pre-installed on the mobile device, and/or downloaded from or upgraded by any number or combination of public and private cloud services/networks, including third party vendors and application stores. For example, the mobile device may be configured to receive hot action patterns from a network server, and implement, apply, and/or use the action patterns to identify and correct suspicious, malicious or performance-degrading mobile device behaviors. The mobile device may also be configured to send generated hot action patterns, generated behavior vectors, the results of the real-time analysis operations, and/or other similar information to a network server or a server in a cloud service/network. The network server may receive the hot action patterns, and apply machine learning and/or context modeling techniques to similar information provided by many mobile devices, and consolidate or otherwise turn such crowd-sourced information into hot action patterns that can be used or accessed by all mobile devices.

The various aspects may be implemented in a number of different mobile devices, including mobile devices including a single processor, multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2A:
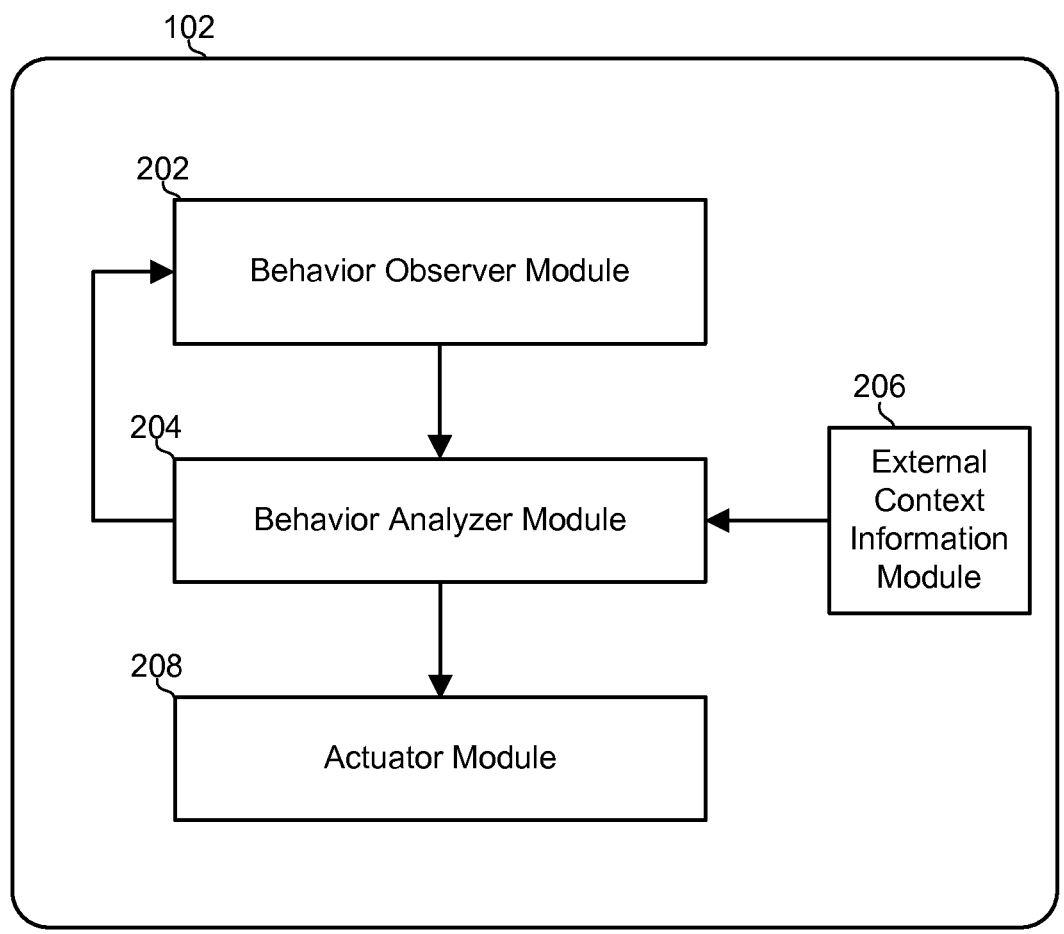
FIGS. 2A-C are block diagrams illustrating example logical components and information flows in an aspect mobile device configured to determine whether a particular mobile device behavior, software application, or process is performance-degrading, suspicious, or benign.
Figure 2B:
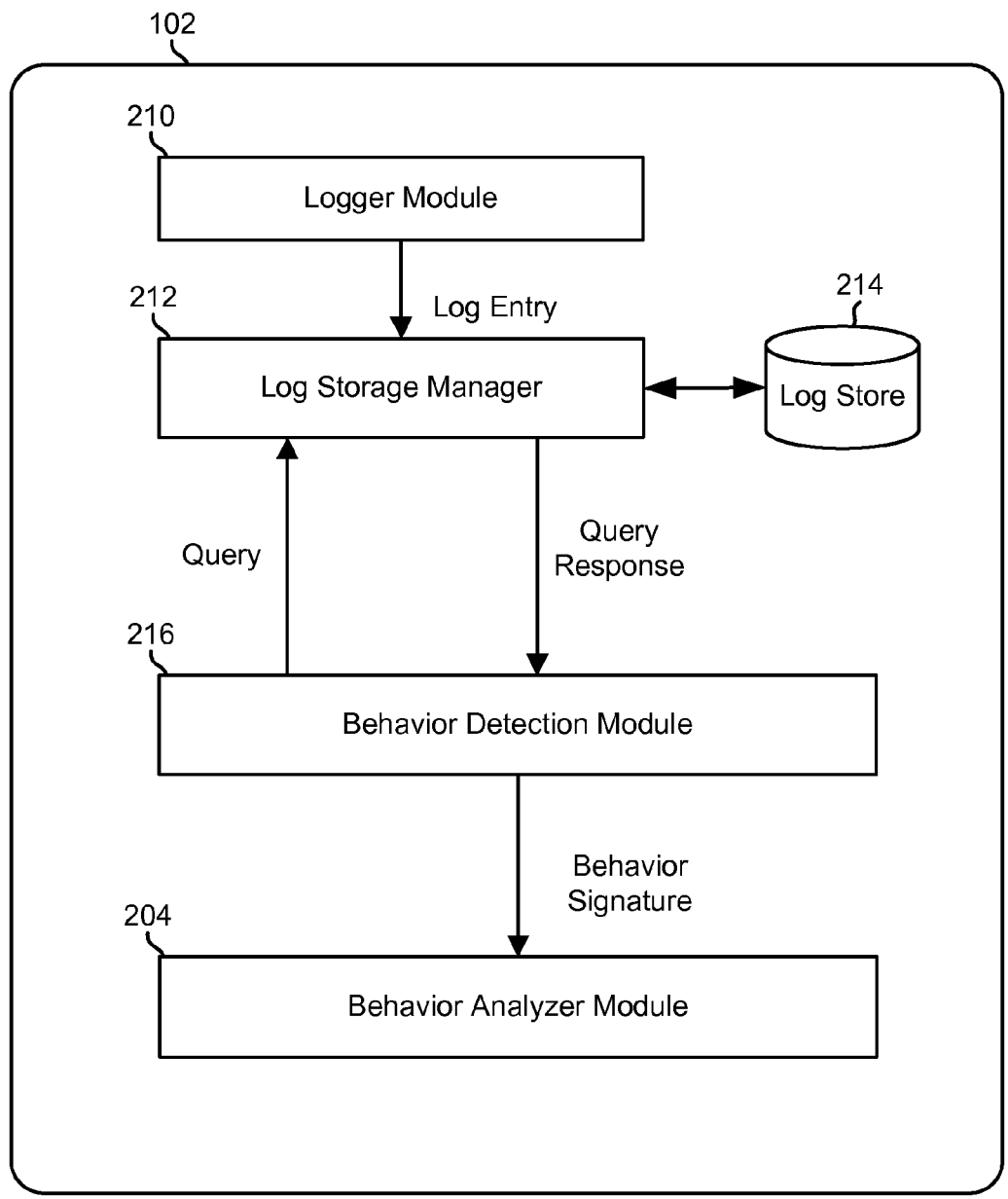
Figure 2C:
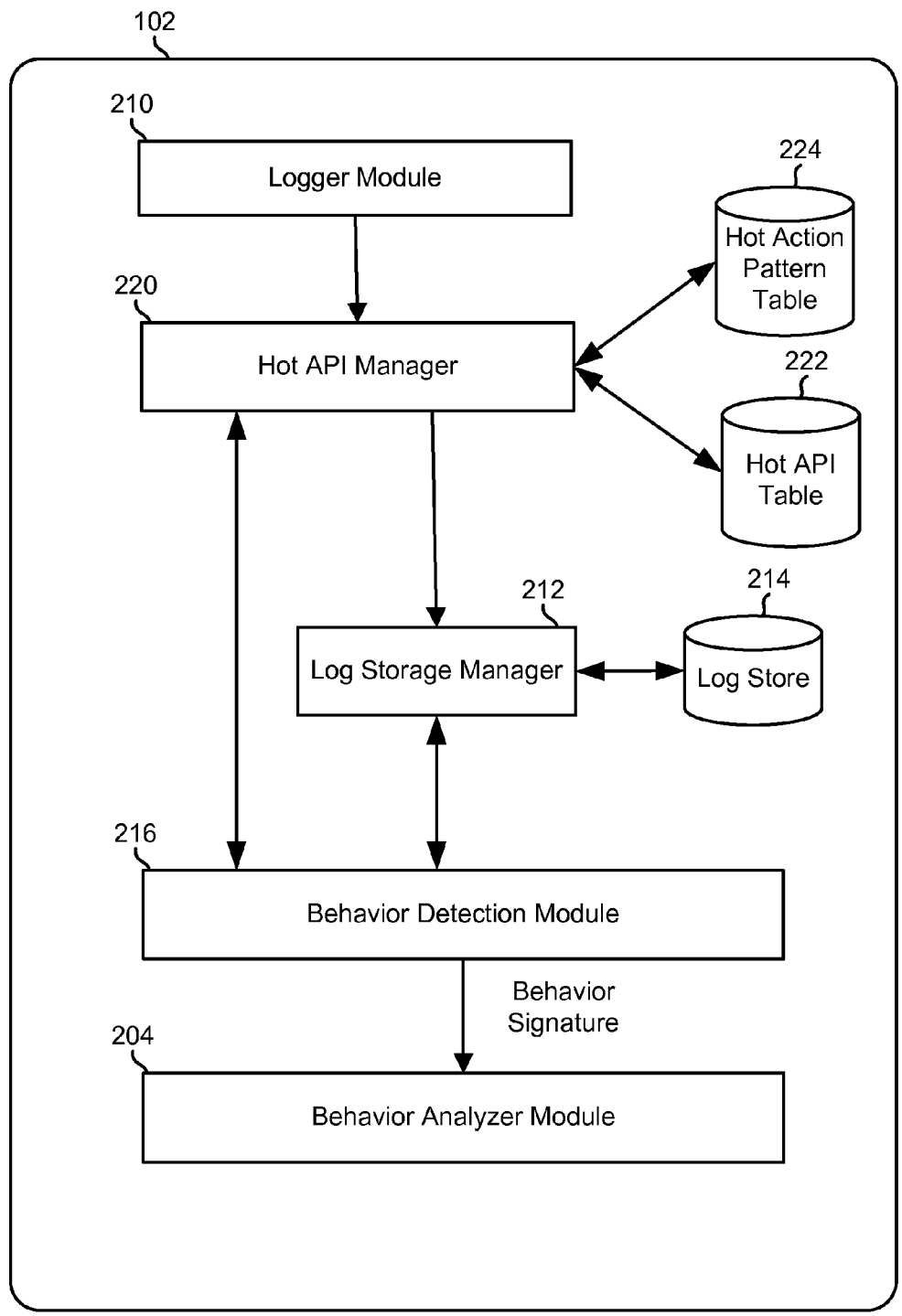

FIGS. 2A-C illustrate example logical components and information flows in an aspect mobile device 102 configured to determine whether a particular mobile device behavior, software application, or process is malicious/performance-degrading, suspicious, or benign.

In the example illustrated in FIG. 2A, the mobile device 102 includes a behavior observer module 202, a behavior analyzer module 204, an external context information module 206, and an actuator module 208. In an aspect, the behavior analyzer module 204 may include a classifier module (not illustrated) and/or one or more classifiers. Each of the modules 202-208 may be implemented in software, hardware, or any combination thereof. For example, in an aspect, one or more of the modules 202-208 may be implemented as software instructions executing on one or more processors of the mobile device 102. In various aspects, the modules 202-208 may be implemented within parts of the operating system (e.g., within the kernel, in the kernel space, in the user space, etc.), within separate programs or applications, in specialized hardware buffers or processors, or any combination thereof.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204. In various aspects, the generated observations may be stored as a behavior vector and/or in an API log file or structure. In the various aspects, the behavior observe module 202 (or another software module) may monitor the frequency of API calls to identify hot APIs, and store identified hot APIs in a hot API log file or structure, which may be a separate file or log that is separate from a log/file of other APIs.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count value or state of hardware-related activities or events occurring in the mobile computing device.

The behavior observer module 202 may also monitor/observe actions or operations (e.g., by logging/observing APIs reflecting or associated with such actions/operations) of software applications, software downloads from an application download server (e.g., Apple® App Store server), mobile device information used by software applications, call information, text messaging information (e.g., the APIs SendSMS, BlockSMS, ReadSMS, etc.), media messaging information (e.g., a ReceiveMMS API), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

Again, to observe such behaviors and component states, the observer module 202 may monitor API calls related to or used for accessing the various components, sensors, data files, etc., store observed API calls/uses in an API log, identify frequently used/called APIs as hot APIs, and store identified hot APIs in a hot API log.

The behavior observer module 202 may be configured to generate behavior vectors that include a concise definition of the observed behaviors. Each behavior vector may succinctly describe observed behavior of the mobile device, software application, or process in a value or vector datastructure (e.g., in the form of a string of numbers, etc.). A behavior vector may also function as an identifier that enables the mobile device system to quickly recognize, identify, and/or analyze mobile device behaviors. In an aspect, the behavior observer module 202 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in an aspect, the behavior observer module 202 may be configured to perform coarse observations by monitoring/observing an initial set of behaviors or factors that are a small subset of all factors that could contribute to the mobile device's degradation. In various aspects, the behavior observer module 202 may receive the initial set of behaviors and/or factors from other mobile devices, a network server, or a component in a cloud service or network.

In an aspect, the initial set of behaviors/factors may be specified in data/behavior models received from the other mobile device, network server or cloud service/network. In an aspect, the initial set of behaviors/factors may be specified in a reduced feature model (RFMs).

The behavior analyzer module 204 may receive the observations, behavior vectors and/or collected behavior information from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to an actuator module, which may perform various operations to operations to heal, cure, isolate, or otherwise fix the identified problem.

The behavior analyzer module 204 may receive the behavior vectors and compare them to one or more behavior modules to determine whether a particular mobile device behavior, software application, or process is performance-degrading/malicious, benign, or suspicious. When it is determined that a behavior, software application, or process is malicious or performance-degrading, the behavior analyzer module 204 may notify the actuator module 208, which may perform various actions or operations to correct mobile device behaviors determined to be malicious or performance-degrading and/or perform operations to heal, cure, isolate, or otherwise fix the identified problem.

When the behavior analyzer module 204 determines that a behavior, software application, or process is suspicious, the analyzer module 204 may notify the behavior observer module 202, which may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the behavior observer module 202 and the analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

Thus, the analyzer module 204 may be configured to receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

The analyzer module 204 may instruct the observer module 202 to perform or enable deeper logging/observations or final logging on the identified subsystems, processes or applications. The observer module 202 may perform deeper observations on the identified subsystems, processes or applications. The observer module 202 may send the results of the deeper observations to the analyzer module 204 for further (and deeper) analysis. These operations may be repeated until the source of a problem is identified or until it is determined that the identified subsystems, processes or applications are not likely to cause problems or degradation. The analyzer module 204 may then send the results of the analysis to the actuation module 208, which may receive the results and perform operations to heal, cure, isolate, or otherwise fix the identified problem.

The observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the computing system 200 to efficiently identify and prevent problems from occurring on mobile devices without requiring a large amount of processor, memory, or battery resources on the device.

The observer module 202 may provide the system with various observer modes to enable multi-level logging (e.g., fine grained and coarse-grained logging). The observer module 202 may provide the ability to automatically and dynamically switch between the different observer modes. The observer module 202 may monitor and restrict process/application that may exhaust system resources. The observer module 202 may manage communications (e.g., non-secure to secure world) overhead, such that the overhead is minimal and flow control is maintained/performed efficiently.

In an aspect, the observer module 202 may be configured to store the behavior information as observations in a space efficient and query-service-time efficient manner to reduce the performance-impact on benign applications and the mobile device.

In the example illustrated in FIG. 2B, the mobile device 102 includes a behavior analyzer module 204, a logger module 210, a log storage manager 212, a log store 214, and a behavior detection module 16. In an aspect, the behavior detection module 216 may included in the behavior observer module 202 illustrated in FIG. 2A The logger module 210 may be configured to generate log entries for each software application that executes in the mobile device 102. The log storage manager 212 may format and store the log entries in a log store 214 in memory of the mobile device 102. The behavior detection module 216 may query the log storage manager 212 for behavior information, and in response, receive behavior information and/or API log entries. The behavior detection module 216 may use the information received from the log storage manager 212 to generate a behavior vector that includes a concise definition of an observed mobile device behavior. In an aspect, the behavior vector may be a behavior signature that functions as an identifier that may be used by the behavior analyzer module 204 to quickly and efficiency identify, analyze, and/or classify a mobile device behavior.

In the example illustrated in FIG. 2C, the mobile device 102 further includes a hot API manager 220, a hot API table component 222, and a hot action pattern table component 224. The hot API manager 220 may be configured to identify the frequency at which APIs are invoked, classify the most frequently invoked APIs as hot APIs, determine the fields/values in the hot APIs that are generic fields/values that have a high probability of being the same across different invocations of an API, determine the fields/values in the hot APIs that are specific values that have a high probability of changing across different invocations the API, and store the generic and specific values in separate tables in the hot API table component 222.

The hot API manager 220 may also be configured to identify frequently used sequences or patterns of API invocations and store the identified sequences/patterns as a "hot action pattern" in a hot action pattern table component 222. The mobile device may be configured to store the hot action patterns as a vector, a sequence (<api1, api2, . . . apin>), a regular expression of APIs, a state diagram, or in any other concise data structure or format. For example, the hot action patterns may be generated so that they parameterize a pattern definition, store generic parameters that are the same across invocations of an API only once, etc.

In an aspect, the hot API manager 220 may be configured to format the information received from the logger module 210 and send the formatted information to the log storage manager 212, which may store the information in a log store 214. In an embodiment, the logger module 210 may be configured to store the hot API information in a consolidated log.

The behavior detection module 216 may query the log storage manager 212 and/or hot API manager 220 for behavior information, and in response, receive behavior information and/or API log entries. The behavior detection module 216 may use this information to generate a behavior vector that includes a concise definition of an observed mobile device behavior that may be used by the behavior analyzer module 204 to identify, analyze, and/or classify a mobile device behavior. In an aspect, the behavior analyzer module 204 may be configured to compare the hot action patterns included in the behavior vector to known statistics of API usage to quickly and efficiently classify a mobile device behavior as benign or malicious/performance-degrading.

Figure 3A:
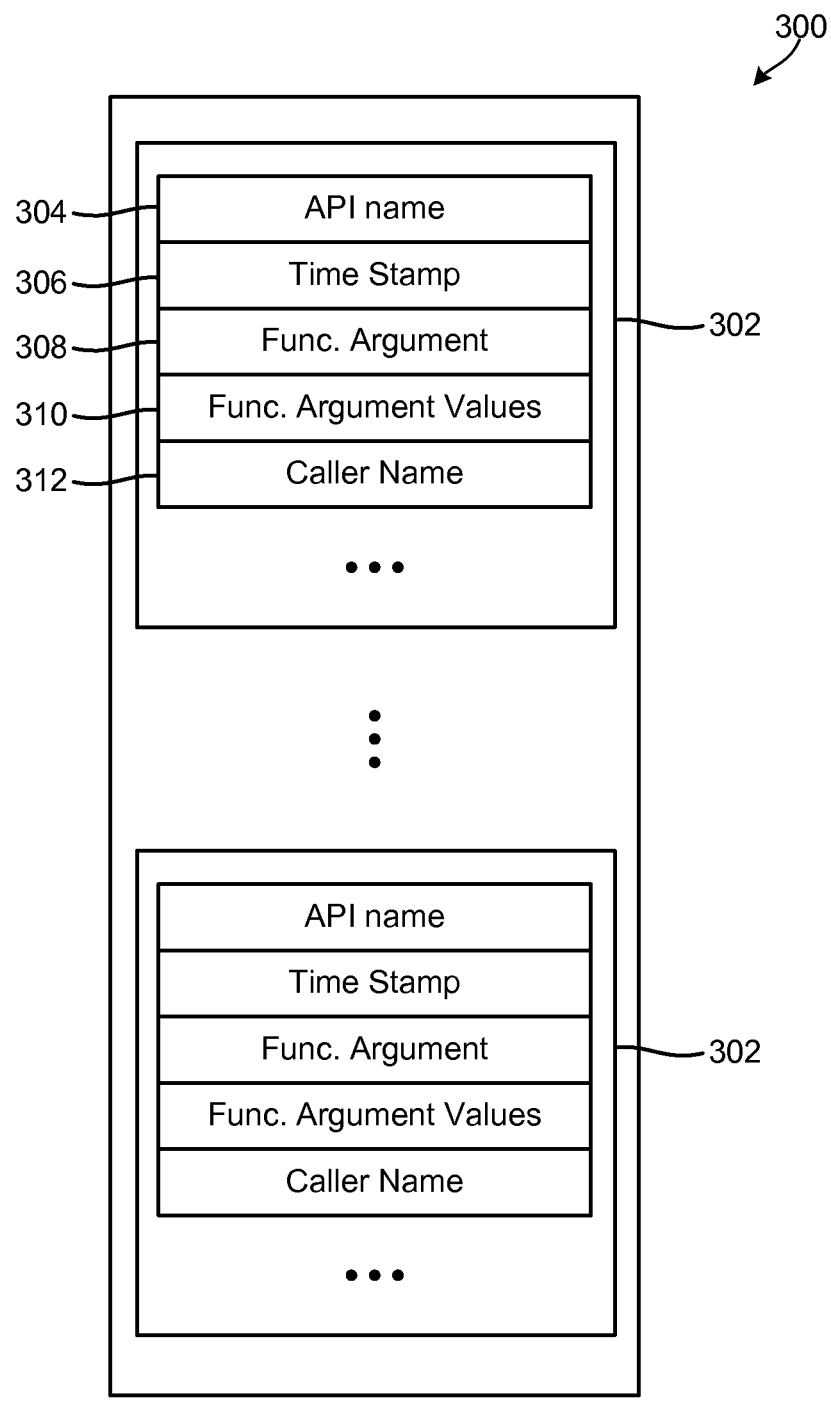
FIGS. 3A and 3B are block diagrams illustrating example log structures for storing log entries in log files in accordance with various aspects.
Figure 3B:
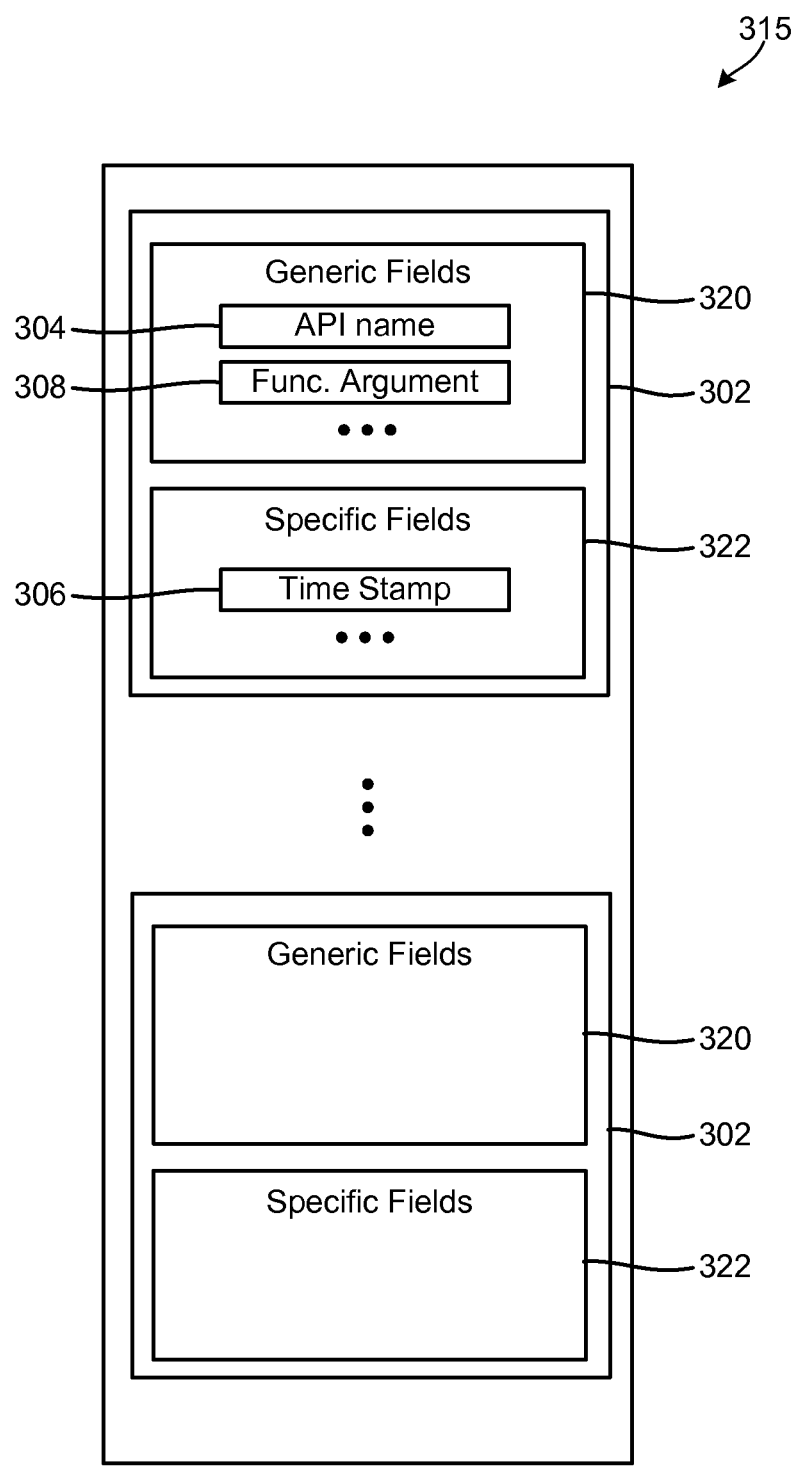

FIGS. 3A and 3B illustrate example log structures for storing log entries in an API log. Specifically, FIG. 3A illustrates that an API log 300 may include a plurality of log entries 302, each of which stores various different types of information. For example, the log entries may store an API name 304, a timestamp 306, function arguments 308, function argument values 310, caller names 312, etc. FIG. 3B illustrates that an API log 315 may be generated so that information in each log entry 302 is categorized as being either a generic field 320 or a specific field 322. The generic fields 320 may include values/fields that are the same across different invocations of the API and whose specific values are not likely to be relevant to the behavior analysis operations of the behavior analyzer module 204. The specific fields 322 may include values of the fields that are specific to the invocation and/or which are likely to be used by the behavior analyzer module 204.

In the example illustrated in FIG. 3B, the generic fields 320 include the API name 304 and function argument fields 308. These values are typically the same across different invocations of the API and generally do not store information that is useful for determining whether a mobile device behavior is malicious or benign. The specific fields 322 may include a timestamp 306 value, and this information is generally specific to an invocation and may be relevant to determining whether the mobile device behavior is malicious or benign (e.g., application performing a send operation at midnight, etc.).

In various aspects, a mobile device may be configured to identify the frequency at which certain APIs are used, and tailor the operations of the behavior observer and/or analyzer modules to focus on those APIs that are used most often. In an aspect, the mobile device may be configured to identify hot APIs (i.e., frequently invoked APIs), determine which fields may be categorized as generic, and store the generic fields for those APIs just once. Since these APIs are the ones that are most frequently invoked, storing the generic fields only once may significantly reduce the amount of information that is stored in each software application's API log.

Figure 4:
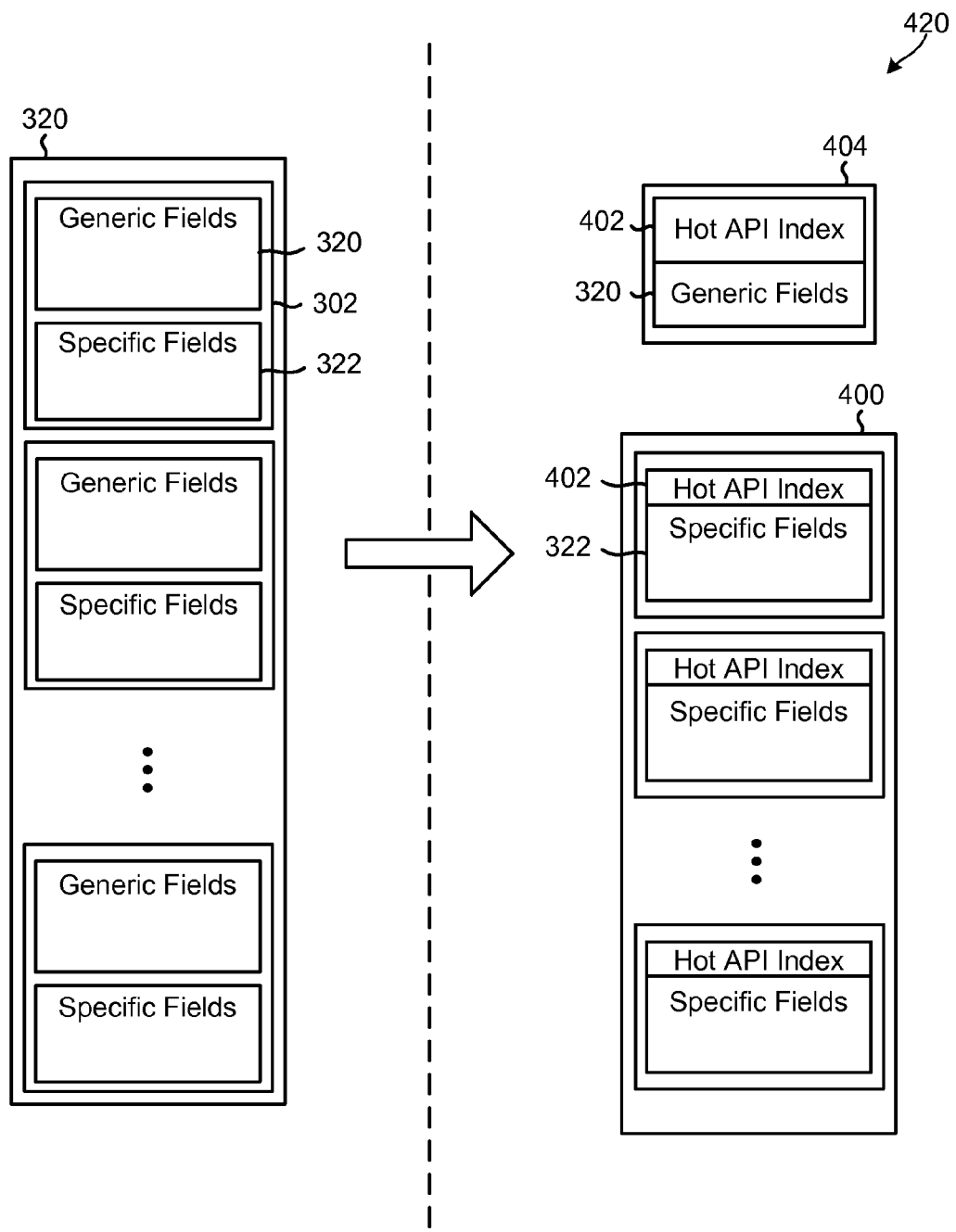
FIG. 4 is a block diagram illustrating a consolidated log that includes tables suitable for storing application programming interface (API) invocation information for hot APIs in accordance with an aspect.

FIG. 4 illustrates a consolidated log 420 that includes tables 400, 404 suitable for storing API invocation information for hot APIs in accordance with an aspect. Specifically, FIG. 4 illustrates that an API log 320 may include a plurality of log entries 302, and that each log entry 302 may be organized/categorized into generic fields 320 and specific fields 322.

In an aspect, the specific fields 322 may be stored in a hash table 400 along with hot API index values 402 in a consolidated log 420. The hot API index values 402 may be stored as hash key in a hot API table 404 that stores the generic fields 320 for the hot APIs. Since the generic fields 320 store the same values for different invocations of an API, multiple hot API index values 402 may be used as keys to the same hot API table 404. This reduces the amount of information that is stored in the consolidated log 420 by eliminating many repetitive entries that would be included in a conventional API log. Further, since the generic fields 320 are not likely to be useful for the behavior analysis operations, the system can better tolerate the longer access times that may be required to retrieve values from the hot API table 404.

Figure 5:
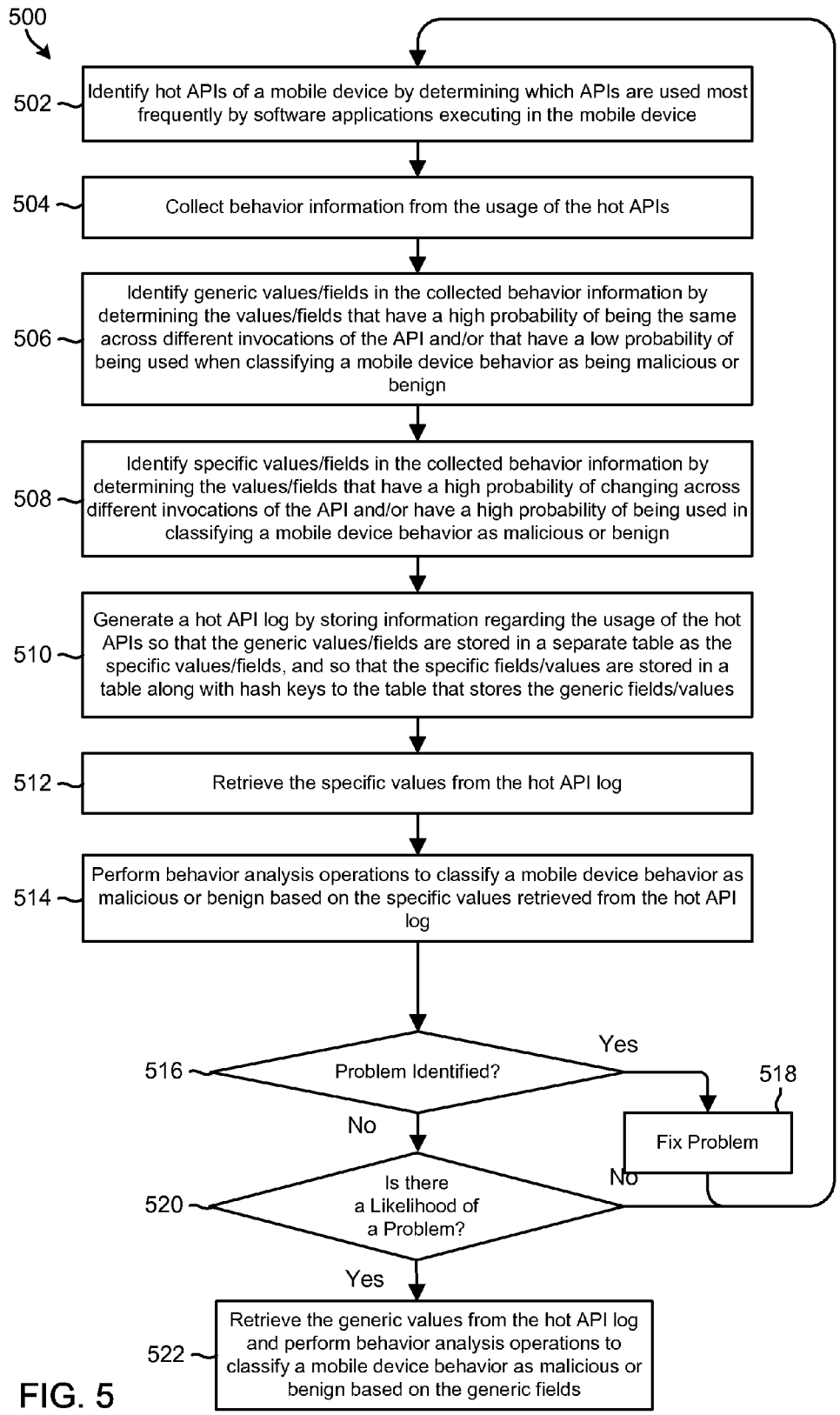
FIG. 5 is a process flow diagram illustrating an aspect method of identifying and storing hot APIs in a consolidated log and using information stored in the consolidated log to quickly and efficiently analyze of the mobile device behaviors.

FIG. 5 illustrates an aspect method 500 of identifying and storing hot APIs in a consolidated log, and using log to quickly and efficiently analyze the mobile device behaviors. Method 500 may be performed by a processing core in a mobile computing device and/or as part of a comprehensive behavior monitoring and analysis solution. In block 502, the processing core may identify hot APIs by determining the APIs that are used most frequently by software applications of the mobile device. This may be accomplished by reading information from an API log file and/or monitoring library API calls, system API calls, driver API calls, etc. in the mobile device. In block 504, the processing core may collect behavior information from the usage of the hot APIs by the software applications.

In block 506, the processing core may identify generic values/fields in the collected behavior information by determining the values/fields that have a high probability of being the same across different invocations of the API and/or that have a low probability of being used when classifying a mobile device behavior as being malicious or benign. That is, in block 506, the processing core may classify an API information field as a generic field in response to determining that there is a low probability that a value of the API information field will change across different invocations of that API and/or in response to determining that there is a low probability that a value of the API information field will be used when performing behavior analysis operations.

In block 508, the processing core may identify specific values/fields in the collected behavior information by determining the values/fields that have a high probability of changing across different invocations of the API and/or have a high probability of being used in classifying a mobile device behavior as malicious or benign. That is, in block 508, the processing core may classify an API information field as a specific field in response to determining that there is a high probability that a value of the API information field will change across different invocations of that API and/or in response to determining that there is a high probability that a value of the API information field will be used when performing the behavior analysis operations.

In block 510, the processing core may generate a hot API log so that the generic values/fields are stored in a separate table as the specific values/fields, and so that the specific fields/values are stored in a table along with hash keys to the table that stores the generic fields/values. In block 512, the processing core may retrieve the specific values from the hot API log. In block 514, the processing core may perform behavior analysis operations to classify a mobile device behavior as being either malicious or benign based on the specific values retrieved from the hot API log.

In determination block 516, the processing core may determine whether suspicious behaviors or potential problems can be identified based on the results of the behavioral analysis operations performed in block 514. When the processing core determines that the suspicious behaviors or potential problems can be identified based on the results of the behavioral analysis (i.e., determination block 516="Yes"), the processing core may initiate a process to correct the behavior in block 518 and continue performing additional observations, identify additional APIs as being hot APIs, and/or update the list of Hot APIs in block 502.

When the processing core determines that the suspicious behaviors or potential problems can not be identified based on the results of the behavioral analysis (i.e., determination block 516="No"), the processing core may determine whether there is a likelihood of a problem in determination block 520.

In an aspect, the processing core may determine that there is a likelihood of a problem by computing a probability of the mobile device encountering potential problems and/or engaging in suspicious behaviors, and determining whether the computed probability is greater than a predetermined threshold. When the processing core determines that the computed probability is not greater than the predetermined threshold and/or there is not a likelihood that suspicious behaviors or potential problems exist and/or are detectable (i.e., determination block 520="No"), the processing core may return to block 502 to perform additional observations, identify additional APIs as being hot APIs, and/or update the list of Hot APIs.

When the processing core determines that the computed probability is greater than the predetermined threshold and/or there is a likelihood that suspicious behaviors or potential problems exist and/or are detectable (i.e., determination block 520="Yes"), the processing core may retrieve generic values from the hot API log and/or perform additional behavior monitoring or analysis operations to classify the behavior as malicious or benign. The operations of blocks 502-522 may be performed repeatedly and/or in low power or background processes so as to continuously (or near continuously) monitor mobile device behaviors and prevent or correct problematic or malicious behaviors without consuming a significant amount of the mobile device's processing, memory, or power resources.

In an aspect, method 500 may be performed by a processing core in a mobile device as part of a method of analyzing mobile device behaviors and/or as part of a comprehensive behavior monitoring and analysis solution. For example, the processing core may identify hot application programming interfaces (APIs) by identifying APIs that are used most frequently by software applications executing on the mobile device, store information regarding usage of identified hot APIs in a hot API log in a memory of the mobile device, and perform behavior analysis operations based on the information stored in the hot API log to identify mobile device behaviors that are inconsistent with normal operation patterns. The processing core may perform method 500 to generate the hot API log so that it is organized so that values of generic fields that remain the same across invocations of an API are stored in a separate table as values of specific fields that are specific to each invocation of the API—and so that the values of the specific fields are stored in a table along with hash keys to the separate table that stores the values of the generic fields.

In an aspect, storing information regarding usage of identified hot APIs in the hot API log may include identifying sequences of hot API invocations that are repeated frequently and storing these identified sequences of hot API invocations as hot action patterns in a hot action pattern log. In an aspect, performing the behavior analysis operations based on the information stored in the hot API log may include comparing hot action patterns stored in the hot action pattern log to known statistics of API usage and using the results of this comparison to classify a mobile device behavior as malicious or benign.

Figure 6:
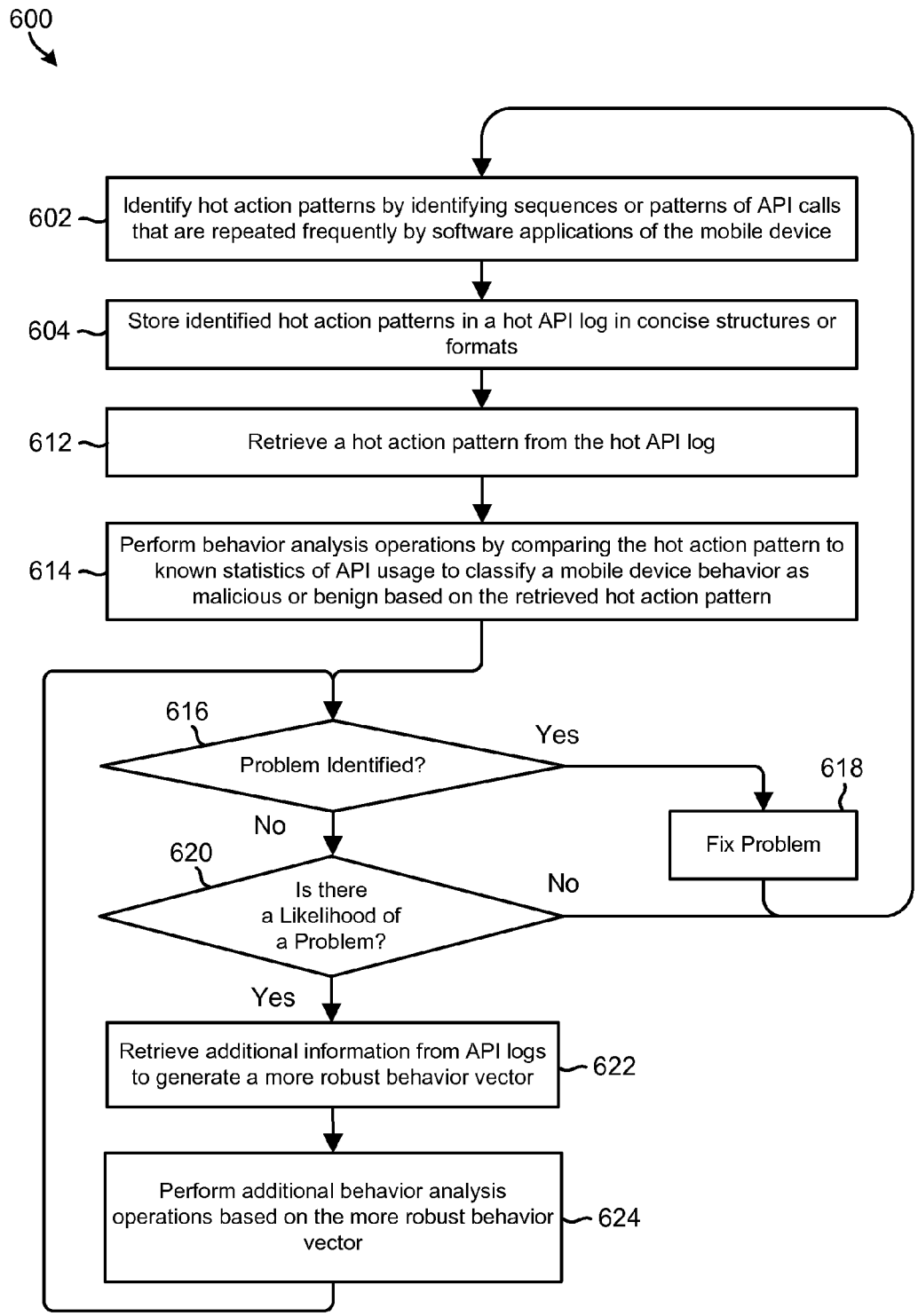
FIG. 6 is a process flow diagram illustrating an aspect method of identifying, storing, and using hot action patterns to quickly identify and/or classify a mobile device behavior.

FIG. 6 illustrates an aspect method 600 of identifying and using hot action patterns to quickly identify and/or classify a mobile device behavior. Method 600 may be performed by a processing core in a mobile computing device and/or as part of a comprehensive behavior monitoring and analysis solution. In block 602, the processing core may identify a sequence or a pattern of API invocations that are repeated or used frequently. An example of an action pattern is a sequence of API calls associated with opening a file, reading the file, and sending the file. Another example of an action pattern is a sequence of API calls associated with querying the mobile device's location, reading the location, and sending the location information to a server. The processing core may identify a sequence/action pattern as being a hot action pattern when the processing core determines from the API invocations that a particular sequence of operations is repeated frequently in the mobile device.

In block 604, the processing core may store the identified hot action patterns in a hot API log (or a hot action pattern log) in concise structures or formats. For example, the processing core may store the hot action patterns as a vector, a sequence (<api1, api2, . . . apin>), a regular expression of APIs, a state diagram, or in any other concise data structure or format that reduces the amount of memory consumed by the API logs. The processing core may also store hot action patterns so that they parameterize a pattern definition, store generic parameters that are the same across invocations of an API only once, etc.

In block 612, the processing core may retrieve a hot action pattern from the hot API log (or a hot action pattern log). In block 614, the processing core may perform behavior analysis operations by comparing the hot action pattern (as well as other hot APIs) to known statistics of API usage to classify a mobile device behavior as malicious or benign.

In determination block 616, the processing core may determine whether suspicious behaviors or potential problems can be identified based on the results of the behavioral analysis operations performed in block 614. When the processing core determines that the suspicious behaviors or potential problems can be identified based on the results of the behavioral analysis (i.e., determination block 616="Yes"), the processing core may initiate a process to correct the behavior in block 618 and continue performing additional observations, identify additional action patterns as being hot action patterns, and/or update the list of hot action patterns in block 602.

When the processing core determines that the suspicious behaviors or potential problems cannot be identified based on the results of the behavioral analysis (i.e., determination block 616="No"), the processing core may determine whether there is a likelihood of a problem in determination block 620. In an aspect, the processing core may determine that there is a likelihood of a problem by computing a probability of the mobile device encountering potential problems and/or engaging in suspicious behaviors, and determining whether the computed probability is greater than a predetermined threshold. When the processing core determines that the computed probability is not greater than the predetermined threshold and/or there is not a likelihood that suspicious behaviors or potential problems exist and/or are detectable (i.e., determination block 620="No"), the processing core may continue performing additional observations, identify additional action patterns as being hot action patterns, and/or update the list of hot action patterns in block 602.

When the processing core determines that the computed probability is greater than the predetermined threshold and/or there is a likelihood that suspicious behaviors or potential problems exist and/or are detectable (i.e., determination block 620="Yes"), the processing core may retrieve additional information from the API logs and/or generate a more robust behavior vector. In block 624, the processing core may perform additional behavior monitoring or analysis operations to classify the behavior as malicious or benign. The operations of blocks 616-624 may be performed repeatedly until the system times out or a problem is identified and fixed.

Figure 7:
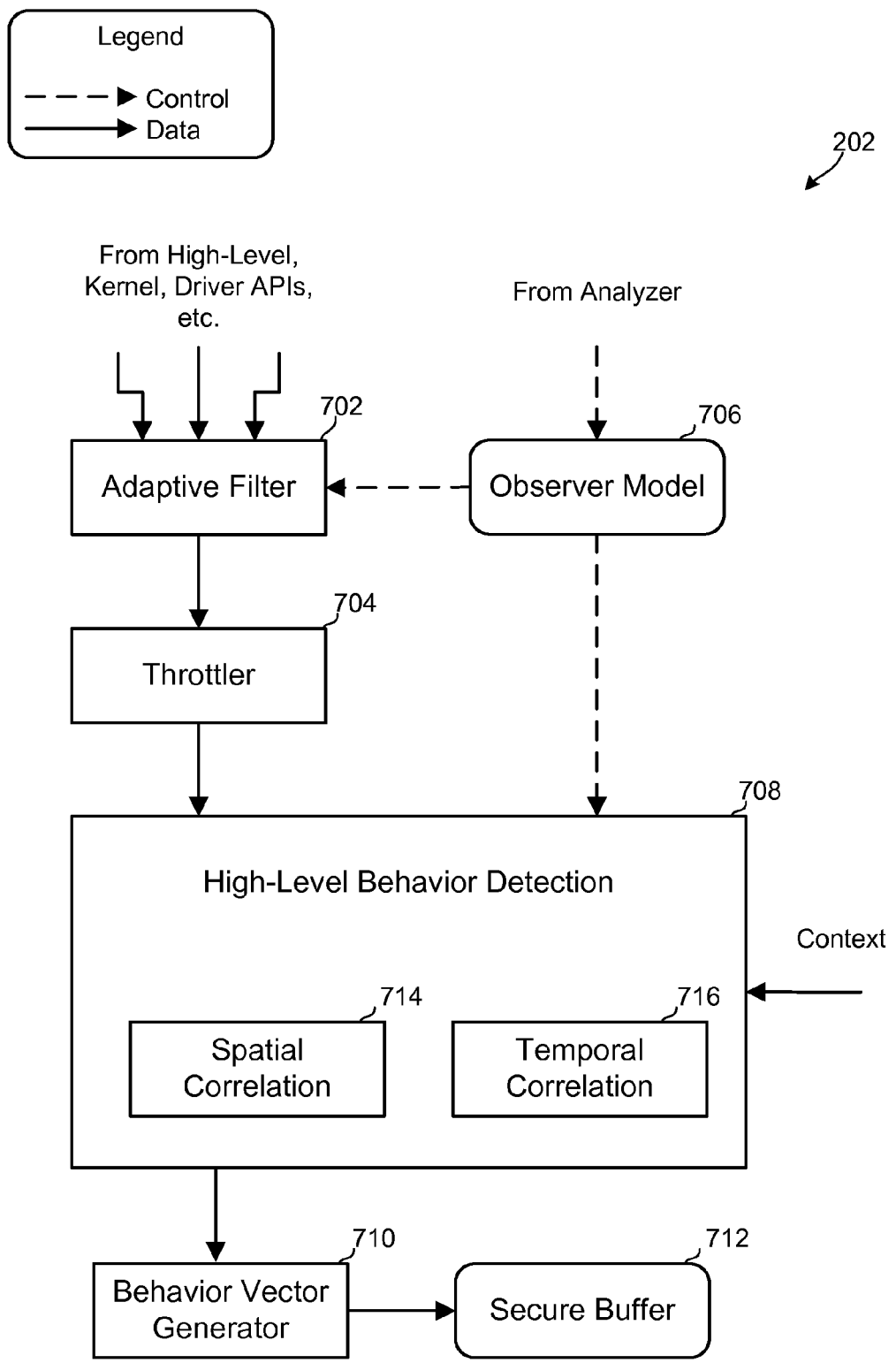
FIGS. 7 and 8 are block diagrams illustrating logical components and information flows in a computing system implementing observer modules and observer daemons in accordance with the various aspects.

FIG. 7 illustrates example logical components and information flows in a behavior observer module 202 of a computing system configured to perform dynamic and adaptive observations in accordance with an aspect. The behavior observer module 202 may include an adaptive filter module 702, a throttle module 704, an observer mode module 706, a high-level behavior detection module 708, a behavior vector generator 710, and a secure buffer 712. The high-level behavior detection module 708 may include a spatial correlation module 714 and a temporal correlation module 716.

The observer mode module 706 may receive control information from various sources, which may include an analyzer unit (e.g., the behavior analyzer module 204 described above with reference to FIGS. 2A-C) and/or an application API. The observer mode module 706 may send control information pertaining to various observer modes to the adaptive filter module 702 and the high-level behavior detection module 708.

The adaptive filter module 702 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 704, which may be responsible for controlling the amount of information flowing from the filter to ensure that the high-level behavior detection module 708 does not become flooded or overloaded with requests or information.

The high-level behavior detection module 708 may receive data/information from the throttle module 704, control information from the observer mode module 706, and context information from other components of the mobile device. The high-level behavior detection module 708 may use the received information to perform spatial and temporal correlations to detect or identify high level behaviors that may cause the device to perform at sub-optimal levels. The results of the spatial and temporal correlations may be sent to the behavior vector generator 710, which may receive the correlation information and generate a behavior vector that describes the behaviors of particular process, application, or sub-system. In an aspect, the behavior vector generator 710 may generate the behavior vector such that each high-level behavior of a particular process, application, or sub-system is an element of the behavior vector. In an aspect, the generated behavior vector may be stored in a secure buffer 712. Examples of high-level behavior detection may include detection of the existence of a particular event, the amount or frequency of another event, the relationship between multiple events, the order in which events occur, time differences between the occurrence of certain events, etc, any or all of which may be determined based on information stored in the API, hot API, and/or hot action pattern logs.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 708 may receive information from the throttle module 704, the observer mode module 706, and context information received from other components (e.g., sensors) of the mobile device. As an example, a high-level behavior detection module 708 performing temporal correlations might detect that a camera has been used and that the mobile device is attempting to upload the picture to a server. The high-level behavior detection module 708 may also perform spatial correlations to determine whether an application on the mobile device took the picture while the device was holstered and attached to the user's belt. The high-level behavior detection module 708 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 708 may recognize this as a potentially threatening behavior and initiate an appropriate response (e.g., shutting off the camera, sounding an alarm, etc.).

In an aspect, the behavior observer module 202 may be implemented in multiple parts.

Figure 8:
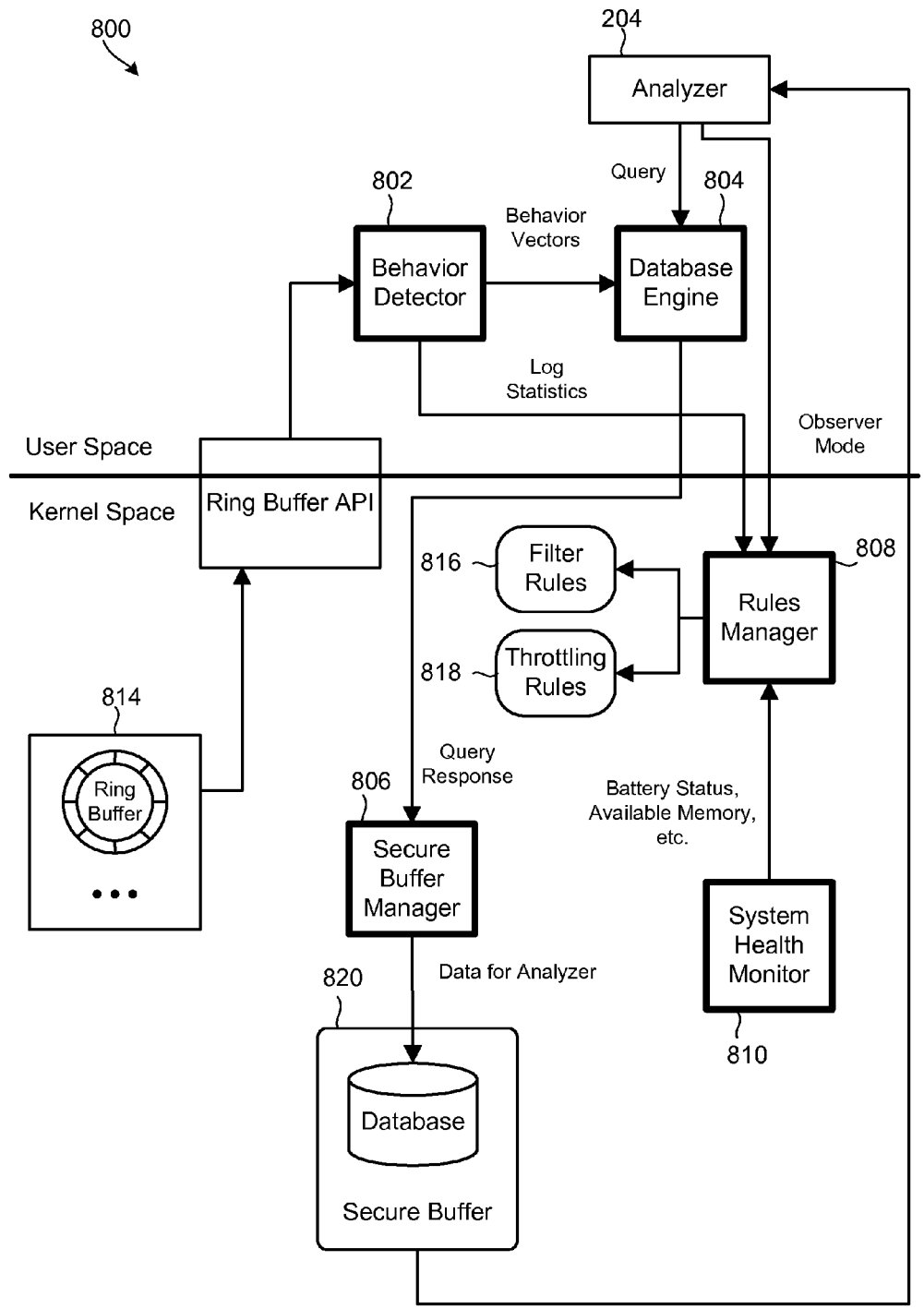

FIG. 8 illustrates logical components and information flows in a computing system 800 implementing an aspect observer daemon. In the example illustrated in FIG. 8, the computing system 800 includes a behavior detector 802 module, a database engine 804 module, and a behavior analyzer module 204 in the user space, and a ring buffer 814, a filter rules 816 module, a throttling rules 818 module, and a secure buffer 820 in the kernel space. The computing system 800 may further include an observer daemon that includes the behavior detector 802 and the database engine 804 in the user space, and the secure buffer manager 806, the rules manager 808, and the system health monitor 810 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9:
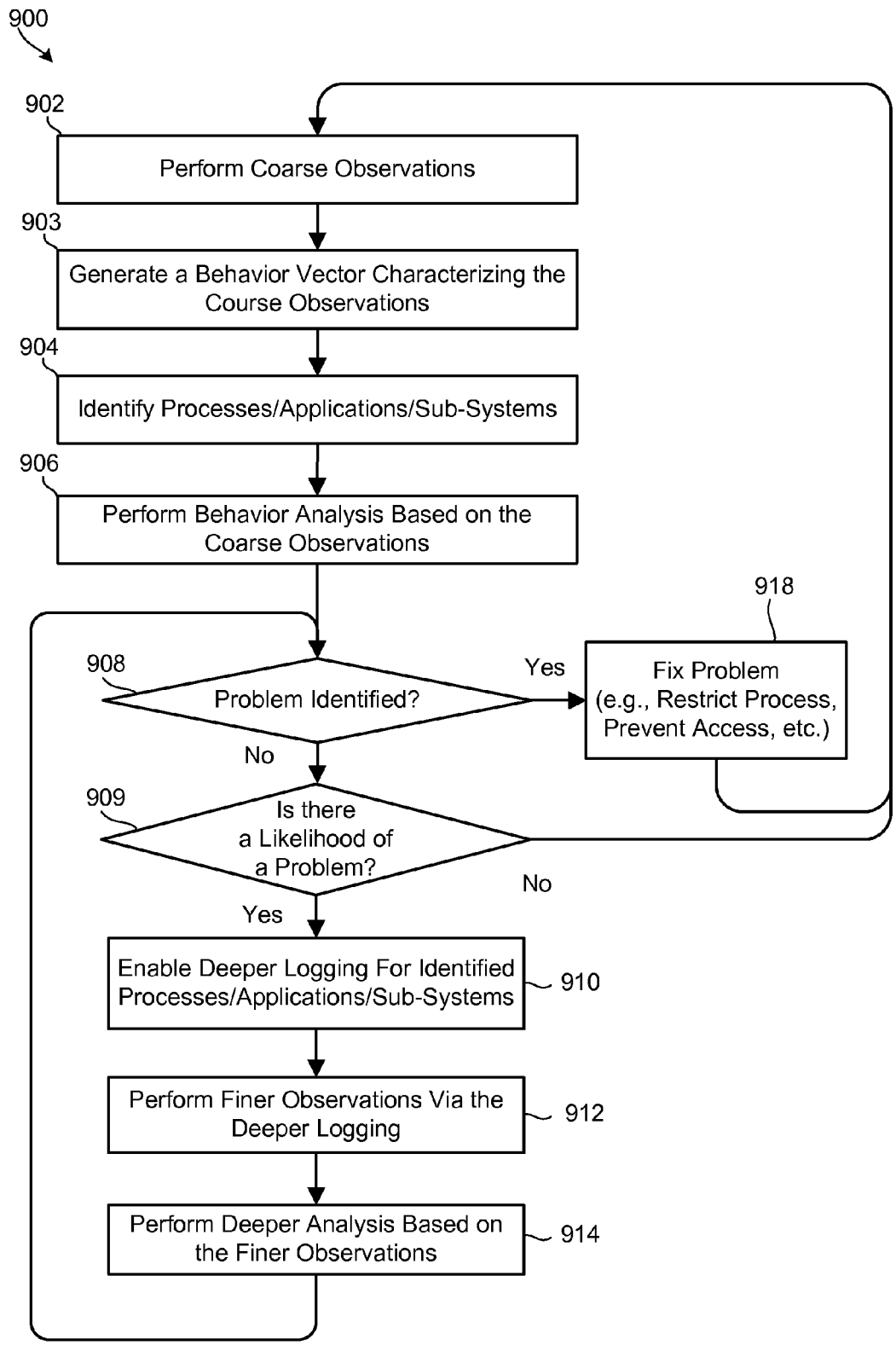
FIG. 9 is a process flow diagram illustrating an aspect method for performing adaptive observations on mobile devices.

FIG. 9 illustrates an example method 900 for performing dynamic and adaptive observations in accordance with an aspect. In block 902, the mobile device processor may perform coarse observations by monitoring/observing a subset of large number factors/behaviors that could contribute to the mobile device's degradation. In block 903, the mobile device processor may generate a behavior vector characterizing the coarse observations and/or the mobile device behavior based on the coarse observations. In block 904, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 906, the mobile device processor may perform behavioral analysis operations based on the coarse observations. In determination block 908, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 908="Yes"), in block 918, the processor may initiate a process to correct the behavior and return to block 902 to perform additional coarse observations.

When the mobile device processor determines that the suspicious behaviors or potential problems can not be identified and/or corrected based on the results of the behavioral analysis (i.e., determination block 908="No"), in determination block 909 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 909="No"), the processor may return to block 902 to perform additional coarse observations.

When the mobile device processor determines that there is a likelihood that suspicious behaviors or potential problems exist and/or are detectable (i.e., determination block 909="Yes"), in block 910, the mobile device processor may perform deeper logging/observations or final logging on the identified subsystems, processes or applications. In block 912, the mobile device processor may perform deeper and more detailed observations on the identified subsystems, processes or applications. In block 914, the mobile device processor may perform further and/or deeper behavioral analysis based on the deeper and more detailed observations. In determination block 908, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 908="No"), the processor may repeat the operations in blocks 910-914 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 908="Yes"), in block 918, the mobile device processor may perform operations to correct the problem/behavior, and the processor may return to block 902 to perform additional operations.

In an aspect, as part of blocks 902-918 of method 900, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
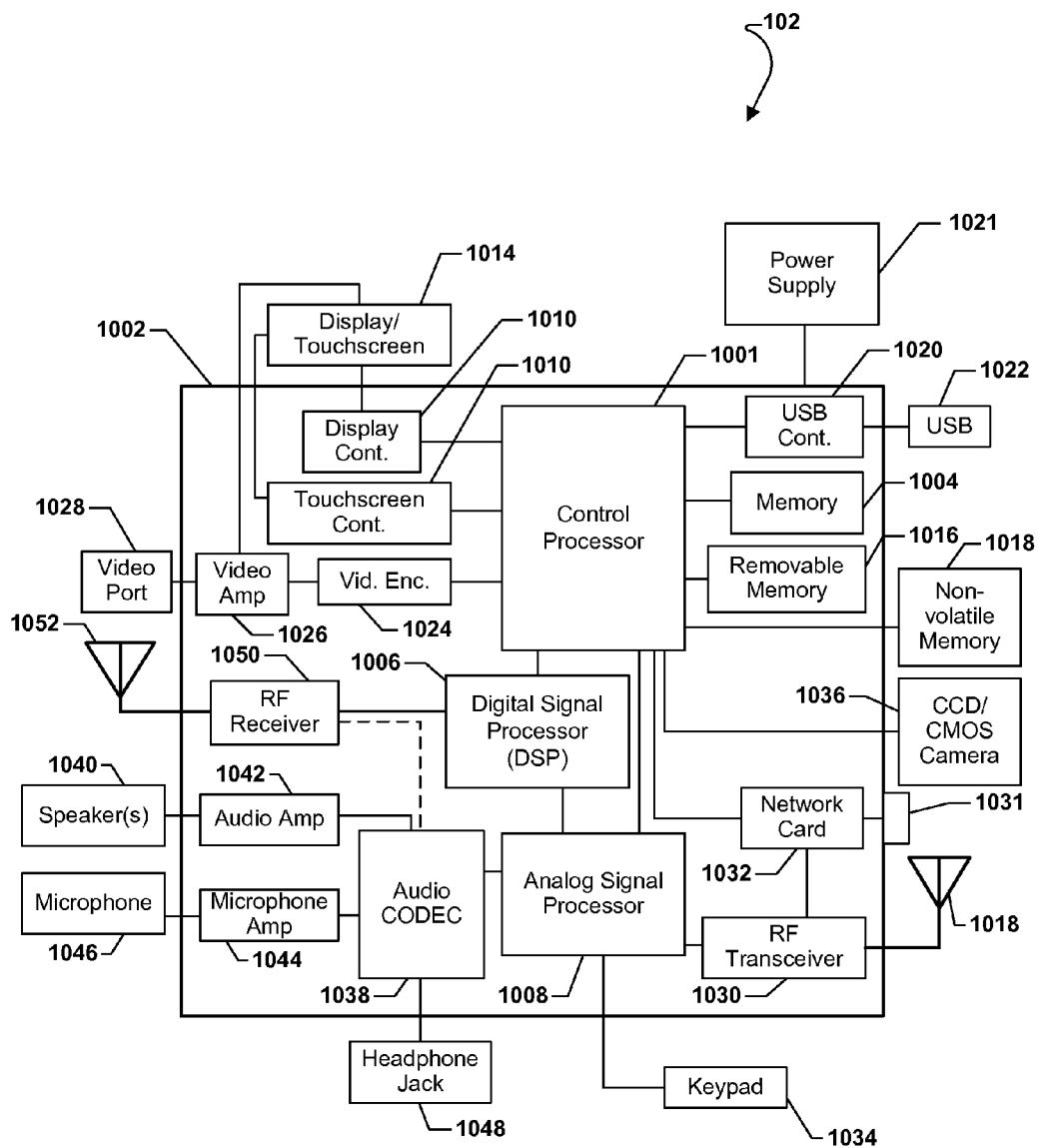
FIG. 10 is a component block diagram of mobile device suitable for use with the various aspects.

Example components and modules of an exemplary, non-limiting aspect of such a mobile device 102 are illustrated in FIG. 10. A mobile computing device 102 may include a circuit board 1002 of electronic components, some or all of which may be integrated into an on-chip system, that includes a control processor 1001 coupled to memory 1004.

The control processor 1001 may further be coupled to a digital signal processor 1006 and/or an analog signal processor 1008, which also be coupled together. In some aspects, the control processor 1001 and a digital signal processor 1006 may be the same component or may be integrated into the same processor chip. A display controller 1008 and a touchscreen controller 1012 may be coupled to the control processor 1001 and to a display/touchscreen 1014 within or connected to the mobile computing device 102.

The control processor 1001 may also be coupled to removable memory 1016 (e.g., an SD memory or SIM card in the case of mobile computing devices) and/or to external memory 1018, such as one or more of a disk drive, CD drive, and a DVD drive. The control processor 1001 may also be coupled to a Universal Serial Bus (USB) controller 1020 which couples to a USB port 1022. In various aspects, a power supply 1021 may be coupled to the circuit board 1002 through the USB controller 1020 or through different electrical connections to provide power (e.g., DC power) to the various electronic components.

The control processor 1001 may also be coupled to a video encoder 1024, e.g., a phase alternating line (PAL) encoder, a sequential couleur a memoire (SECAM) encoder, or a national television system(s) committee (NTSC) encoder. Further, the video encoder 1024 may be coupled to a video amplifier 1026 which may be coupled to the video encoder 1024 and the display/touchscreen 1014. Also, a video port 1028 may be coupled to the video amplifier 1026 to enable connecting the mobile computing device 102 to an external monitor, television or other display (not shown).

The control processor 1001 may be coupled to a radio frequency (RF) transceiver 1030, such as via an analog signal processor 1008. The RF transceiver 1030 may be coupled to an RF antenna 1018 for transmitting and receiving RF signals. The RF transceiver 1030 may be configured to transmit and receive communication signals of one or more different wireless communication protocols including, for example, cellular telephone (e.g., G-3, UMTS, CDMA, etc.), WiFi, WiMax, and Bluetooth.

The control processor 1001 may further be coupled to a network card 1032 which may be coupled to a network connector 1031 and/or the RF transceiver 1030 and configured to enable communications via an external network (e.g., local area networks, the Internet, an intranet, WiFi networks, Bluetooth networks, personal area network (PAN) etc.) The network card 1032 may be in the form of a separate chip or card, or may be implemented as part of the control processor 1001 or the RF transceiver 1030 (or both) as a full solution communication chip.

A number of analog devices may be coupled to the control processor 1001 via the analog signal processor 1008, such as a keypad 1034. In other implementations, a keypad or keyboard may include its own processor so that the interface with the control processor 1001 may be via direct connection (not shown), via a network connection (e.g., via the network card), or via the USB port 1022.

In some implementations, a digital camera 1036 may be coupled to the control processor 1001. In an exemplary aspect, the digital camera 1036 may be a charge-coupled device (CCD) camera or a complementary metal-oxide semiconductor (CMOS) camera. The digital camera 1036 may be built into the mobile computing device 102 or coupled to the device by an external cable.

In some implementations, an audio CODEC 1038 (e.g., a stereo CODEC) may be coupled to the analog signal processor 1008 and configured to send sound signals to one or more speakers 1040 via an audio amplifier 1042. The audio CODEC 1038 may also be coupled to a microphone amplifier 1044 which may be coupled to a microphone 1046 (e.g., via a microphone jack). A headphone jack 1048 may also be coupled to the audio CODEC 1038 for outputting audio to headphones.

In some implementations, the mobile computing device 102 may include a separate RF receiver circuit 1050 which may be coupled to an antenna 1052 for receiving broadcast wireless communication signals. The receiver circuit 1050 may be configured to receive broadcast television signals (e.g., EBMS broadcasts), and provide received signals to the DSP 1006 for processing. In some implementations, the receiver circuit 1050 may be configured to receive FM radio signals, in which case the received signals may be passed to the Audio CODEC 1038 for processing.

In an aspect, processor-executable instructions for accomplishing one or more of the method operations described above may be stored in the internal memory 1004, removable memory 1016 and/or non-volatile memory 1018 (e.g., as on a hard drive, CD drive, or other storage accessible via a network). Such processor-executable instructions may be executed by the control processor 1001 in order to perform the methods described herein.

Figure 11:
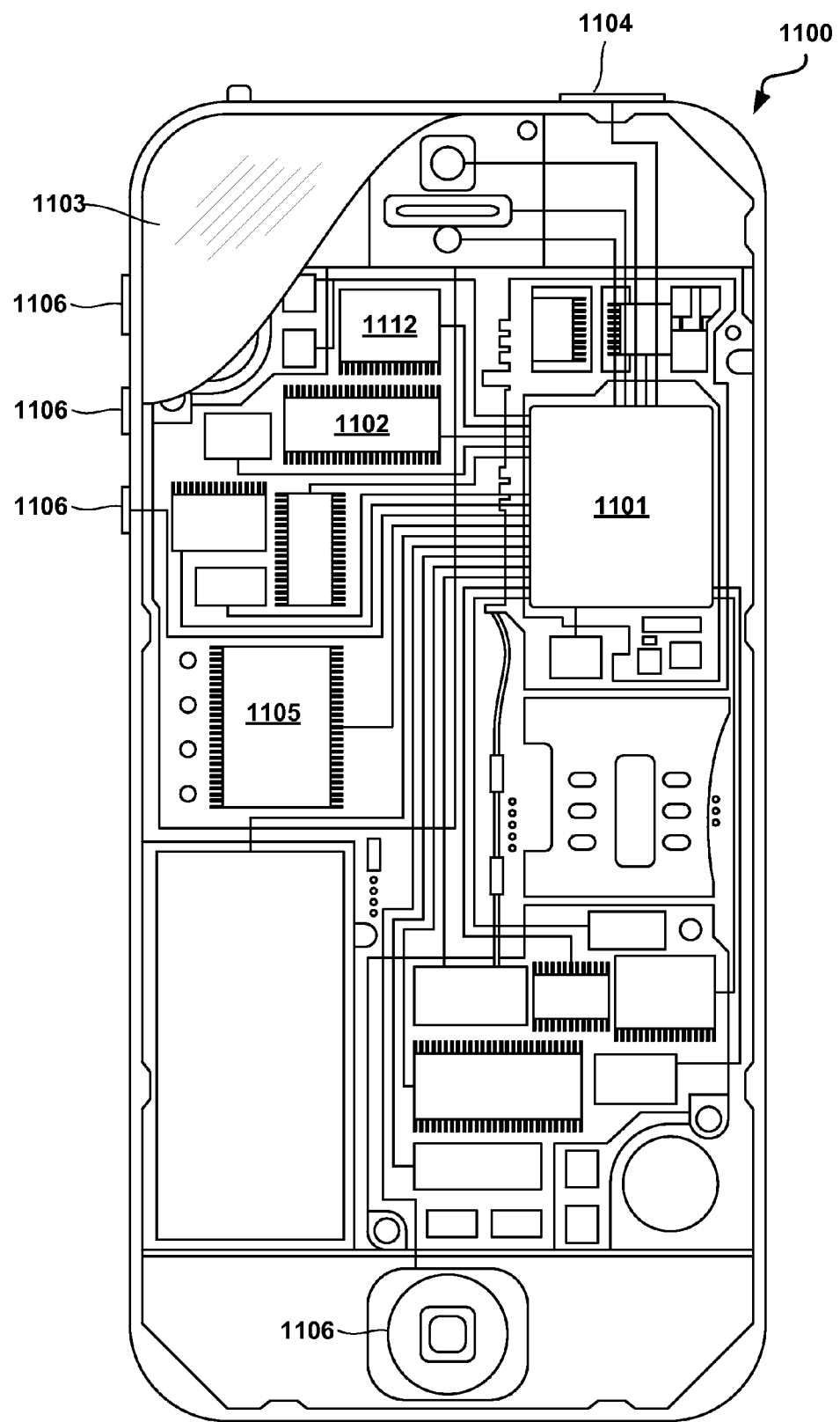
FIG. 11 is an illustration of an example mobile device suitable for use with the various aspects.

The various aspects may be implemented on a variety of mobile computing devices, an example of which is illustrated in FIG. 11 in the form of a smartphone. A smartphone 1100 may include a processor 101 coupled to internal memory 1102, a display 1103, and to a speaker. Additionally, the smartphone 1100 may include an antenna 1104 for sending and receiving electromagnetic radiation that may be connected to a wireless data link and/or cellular telephone transceiver 1105 coupled to the processor 1101. Smartphone 1100 typically also include menu selection buttons or rocker switches 1106 for receiving user inputs.

A typical smartphone 1100 also includes a sound encoding/decoding (CODEC) circuit 1112, which digitizes sound received from a microphone into data packets suitable for wireless transmission and decodes received sound data packets to generate analog signals that are provided to the speaker to generate sound. Also, one or more of the processor 1101, wireless transceiver 1105 and CODEC 1112 may include a digital signal processor (DSP) circuit (not shown separately).

Figure 12:
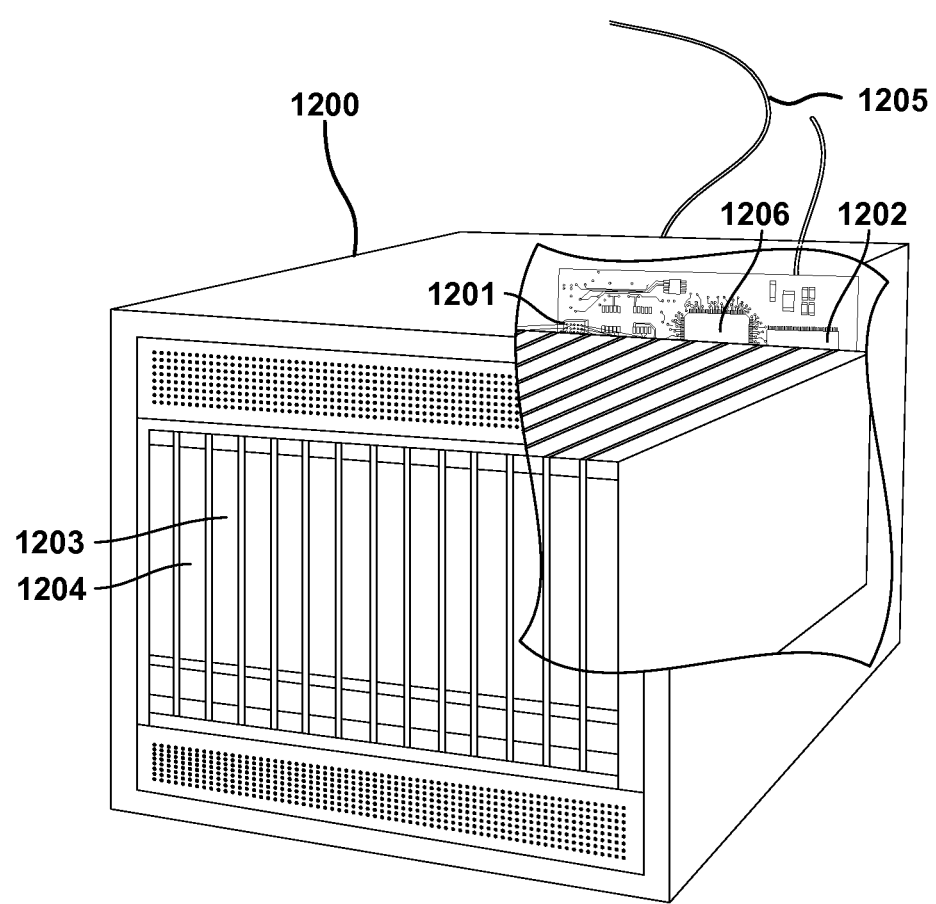
FIG. 12 is an illustration of an example server computer suitable for use with the various aspects.

Portions of the aspect methods may be accomplished in a client-server architecture with some of the processing occurring in a server, such as maintaining databases of action patterns and normal operational behaviors, which may be accessed by a mobile device processor while executing the aspect methods. Such aspects may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1211 coupled to the processor 1201. The server 1200 may also include network access ports 1204 coupled to the processor 1201 for establishing data connections with a network 1205, such as a local area network coupled to other broadcast system computers and servers.

The processors 1101, 1201 may be any programmable microprocessor, microcomputer or multiple processor chip or chips that can be configured by software instructions (applications) to perform a variety of functions, including the functions of the various aspects described below. In some mobile devices, multiple processors 1101 may be provided, such as one processor dedicated to wireless communication functions and one processor dedicated to running other applications. Typically, software applications may be stored in the internal memory 1102, 1202, 1203 before they are accessed and loaded into the processor 1101, 1201. The processor 1101, 1201 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system on chip" (SOC) is used in this application to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used in this application to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used in this application to refer to a system or device that includes two or more processing units configured to read and execute program instructions.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing behaviors within a mobile device, comprising:
   identifying hot application programming interfaces (APIs) by identifying in a processor of the mobile device APIs that are used most frequently by software applications executing on the mobile device;
   storing information regarding usage of identified hot APIs in a hot API log in a memory of the mobile device; and
   performing behavior analysis operations based on the information stored in the hot API log to identify mobile device behaviors that are inconsistent with normal operation patterns, the behavior analysis operations comprising:
      collecting behavior information from the hot API log;
      generating a behavior vector data structure that characterizes the collected behavior information via a plurality of numerical values; and
      comparing the behavior vector data structure to contextual information; and
      determining whether a mobile device behavior is not benign based on the comparison,
   wherein the hot API log is organized so that values of generic fields that remain the same across invocations of an API are stored in a separate table as values of specific fields that are specific to each invocation of the API, and
   wherein the values of the specific fields are stored in a table along with hash keys to the separate table that stores the values of the generic fields.

2. The method of claim 1, wherein:
   storing information regarding usage of identified hot APIs in the hot API log comprises:
      identifying sequences of hot API invocations that are repeated frequently; and
      storing the identified sequences of hot API invocations as hot action patterns in a hot action pattern log; and
   performing the behavior analysis operations based on the information stored in the hot API log further comprises:
      comparing hot action patterns stored in the hot action pattern log to known statistics of API usage; and classifying the mobile device behavior as benign based on a result of comparing hot action patterns to known statistics of API usage.

3. The method of claim 1, wherein identifying in APIs that are used most frequently by software applications executing on the mobile device comprises monitoring one or more of library API calls, system API calls, and driver API calls by reading information from an API log file.

4. The method of claim 1, wherein storing information regarding usage of identified hot APIs in the hot API log comprises:
classifying an API information field as a generic field in response to determining that there is a low probability that a value of the API information field will change across different invocations of that API.

5. The method of claim 1, wherein storing information regarding usage of identified hot APIs in the hot API log comprises:
classifying an API information field as a generic field in response to determining that there is a low probability that a value of the API information field will be used when performing the behavior analysis operations.

6. The method of claim 1, wherein storing information regarding usage of identified hot APIs in the hot API log comprises:
classifying an API information field as a specific field in response to determining that there is a high probability that a value of the API information field will change across different invocations of that API.

7. The method of claim 1, wherein storing information regarding usage of identified hot APIs in the hot API log comprises:
classifying an API information field as a specific field in response to determining that there is a high probability that a value of the API information field will be used when performing the behavior analysis operations.

8. A mobile device, comprising:
means for identifying hot application programming interfaces (APIs) by identifying APIs that are used most frequently by software applications executing on the mobile device;
means for storing information regarding usage of identified hot APIs in a hot API log in a memory of the mobile device; and
means for performing behavior analysis operations based on the information stored in the hot API log to identify mobile device behaviors that are inconsistent with normal operation patterns, the means for performing behavior analysis operations comprising:
means for collecting behavior information from the hot API log;
means for generating a behavior vector data structure that characterizes the collected behavior information via a plurality of numerical values; and
means for comparing the behavior vector data structure to contextual information; and
means for determining whether a mobile device behavior is not benign based on the comparison,
wherein the hot API log is organized so that values of generic fields that remain the same across invocations of an API are stored in a separate table as values of specific fields that are specific to each invocation of the API, and
wherein the values of the specific fields are stored in a table along with hash keys to the separate table that stores the values of the generic fields.

9. The mobile device of claim 8,
wherein means for storing information regarding usage of identified hot APIs in the hot API log comprises:
means for identifying sequences of hot API invocations that are repeated frequently; and
means for storing the identified sequences of hot API invocations as hot action patterns in a hot action pattern log, and
wherein means for performing behavior analysis operations based on the information stored in the hot API log further comprises:
means for comparing hot action patterns stored in the hot action pattern log to known statistics of API usage; and
means for classifying the mobile device behavior as benign based on a result of comparing hot action patterns to known statistics of API usage.

10. The mobile device of claim 8, wherein means for identifying APIs that are used most frequently by software applications executing on the mobile device comprises means for monitoring one or more of library API calls, system API calls, and driver API calls by reading information from an API log file.

11. The mobile device of claim 8, wherein means for storing information regarding usage of identified hot APIs in the hot API log comprises:
means for classifying an API information field as a generic field in response to determining that there is a low probability that a value of the API information field will change across different invocations of that API.

12. The mobile device of claim 8, wherein means for storing information regarding usage of identified hot APIs in the hot API log comprises:
means for classifying an API information field as a generic field in response to determining that there is a low probability that a value of the API information field will be used by the means for performing behavior analysis operations.

13. The mobile device of claim 8, wherein means for storing information regarding usage of identified hot APIs in the hot API log comprises:
means for classifying an API information field as a specific field in response to determining that there is a high probability that a value of the API information field will change across different invocations of that API.

14. The mobile device of claim 8, wherein means for storing information regarding usage of identified hot APIs in the hot API log comprises:
means for classifying an API information field as a specific field in response to determining that there is a high probability that a value of the API information field will be used by the means for performing behavior analysis operations.

15. A mobile device, comprising:
a memory; and
a processor coupled to the memory, wherein the processor is configured with processor-executable instructions to perform operations comprising:
identifying hot application programming interfaces (APIs) by identifying APIs that are used most frequently by software applications executing on the mobile device;
storing information regarding usage of identified hot APIs in a hot API log in the memory; and
performing behavior analysis operations based on the information stored in the hot API log to identify mobile device behaviors that are inconsistent with normal operation patterns, the behavior analysis operations comprising:
   collecting behavior information from the hot API log;
   generating a behavior vector data structure that characterizes the collected behavior information via a plurality of numerical values; and
   comparing the behavior vector data structure to contextual information; and
   determining whether a mobile device behavior is not benign based on the comparison,
wherein the hot API log is organized so that values of generic fields that remain the same across invocations of an API are stored in a separate table as values of specific fields that are specific to each invocation of the API, and
wherein the values of the specific fields are stored in a table along with hash keys to the separate table that stores the values of the generic fields.

16. The mobile device of claim 15, wherein:
the processor is configured with processor-executable instructions to perform operations such that storing information regarding usage of identified hot APIs in the hot API log comprises:
   identifying sequences of hot API invocations that are repeated frequently; and
   storing the identified sequences of hot API invocations as hot action patterns in a hot action pattern log, and
the processor is further configured with processor-executable instructions to perform operations such that performing the behavior analysis operations based on the information stored in the hot API log further comprises:
   comparing hot action patterns stored in the hot action pattern log to known statistics of API usage; and
   classifying the mobile device behavior as benign based on a result of comparing hot action patterns to known statistics of API usage.

17. The mobile device of claim 15, wherein the processor is configured with processor-executable instructions to perform operations such that identifying APIs that are used most frequently by software applications executing on the mobile device comprises monitoring one or more of library API calls, system API calls, and driver API calls by reading information from an API log file.

18. The mobile device of claim 15, wherein the processor is configured with processor-executable instructions to perform operations such that storing information regarding usage of identified hot APIs in the hot API log comprises:
   classifying an API information field as a generic field in response to determining that there is a low probability that a value of the API information field will change across different invocations of that API.

19. The mobile device of claim 15, wherein the processor is configured with processor-executable instructions to perform operations such that storing information regarding usage of identified hot APIs in the hot API log comprises:
   classifying an API information field as a generic field in response to determining that there is a low probability that a value of the API information field will be used when performing the behavior analysis operations.

20. The mobile device of claim 15, wherein the processor is configured with processor-executable instructions to perform operations such that storing information regarding usage of identified hot APIs in the hot API log comprises:
   classifying an API information field as a specific field in response to determining that there is a high probability that a value of the API information field will change across different invocations of that API.

21. The mobile device of claim 15, wherein the processor is configured with processor-executable instructions to perform operations such that storing information regarding usage of identified hot APIs in the hot API log comprises:
   classifying an API information field as a specific field in response to determining that there is a high probability that a value of the API information field will be used when performing the behavior analysis operations.

22. A non-transitory computer readable storage medium having stored thereon processor-executable software instructions configured to cause a mobile device processor in a mobile device to perform operations comprising:
   identifying hot application programming interfaces (APIs) by identifying APIs that are used most frequently by software applications executing on the mobile device;
   storing information regarding usage of identified hot APIs in a hot API log in a memory of the mobile device; and
   performing behavior analysis operations based on the information stored in the hot API log to identify mobile device behaviors that are inconsistent with normal operation patterns, the behavior analysis operations comprising:
     collecting behavior information from the hot API log;
     generating a behavior vector data structure that characterizes the collected behavior information via a plurality of numerical values; and
     comparing the behavior vector data structure to contextual information; and
     determining whether a mobile device behavior is not benign based on the comparison,
wherein the hot API log is organized so that values of generic fields that remain the same across invocations of an API are stored in a separate table as values of specific fields that are specific to each invocation of the API, and
wherein the values of the specific fields are stored in a table along with hash keys to the separate table that stores the values of the generic fields.

23. The non-transitory computer readable storage medium of claim 22, wherein the stored processor-executable software instructions are configured to cause a processor to perform operations such that:
   storing information regarding usage of identified hot APIs in the hot API log comprises:
     identifying sequences of hot API invocations that are repeated frequently; and
     storing the identified sequences of hot API invocations as hot action patterns in a hot action pattern log; and
   performing the behavior analysis operations based on the information stored in the hot API log further comprises:
     comparing hot action patterns stored in the hot action pattern log to known statistics of API usage; and
     classifying the mobile device behavior as benign based on a result of comparing hot action patterns to known statistics of API usage.

24. The non-transitory computer readable storage medium of claim 22, wherein the stored processor-executable software instructions are configured to cause a processor to perform operations such that identifying APIs that are used most frequently by software applications executing on the mobile device comprises monitoring one or more of library API calls, system API calls, and driver API calls by reading information from an API log file.

25. The non-transitory computer readable storage medium of claim 22, wherein the stored processor-executable software instructions are configured to cause a processor to perform operations such that storing information regarding usage of identified hot APIs in the hot API log comprises:
classifying an API information field as a generic field in response to determining that there is a low probability that a value of the API information field will change across different invocations of that API.

26. The non-transitory computer readable storage medium of claim 22, wherein the stored processor-executable software instructions are configured to cause a processor to perform operations such that storing information regarding usage of identified hot APIs in the hot API log comprises:
classifying an API information field as a generic field in response to determining that there is a low probability that a value of the API information field will be used when performing the behavior analysis operations.

27. The non-transitory computer readable storage medium of claim 22, wherein the stored processor-executable software instructions are configured to cause a processor to perform operations such that storing information regarding usage of identified hot APIs in the hot API log comprises:
classifying an API information field as a specific field in response to determining that there is a high probability that a value of the API information field will change across different invocations of that API.

28. The non-transitory computer readable storage medium of claim 22, wherein the stored processor-executable software instructions are configured to cause a processor to perform operations such that storing information regarding usage of identified hot APIs in the hot API log comprises:
classifying an API information field as a specific field in response to determining that there is a high probability that a value of the API information field will be used when performing the behavior analysis operations.

* * * * *